(12) United States Patent
Helbig et al.

(10) Patent No.: US 10,443,381 B2
(45) Date of Patent: Oct. 15, 2019

(54) ADJUSTABLE MINE VENTILATION SYSTEM AND METHOD

(71) Applicant: GMS MINE REPAIR AND MAINTENANCE, INC., Mountain Lake Park, MD (US)

(72) Inventors: Courtland Joshua Helbig, Morgantown, WV (US); Nathanael Rogers, Mountain Lake Park, MD (US); Timothy Dale Beeman, Lonaconing, MD (US)

(73) Assignee: GMS MINE REPAIR AND MAINTENANCE, INC., Mountain Lake Park, MD (US)

( * ) Notice: Subject to any disclaimer, the term of this patent is extended or adjusted under 35 U.S.C. 154(b) by 385 days.

(21) Appl. No.: 14/980,837

(22) Filed: Dec. 28, 2015

(65) Prior Publication Data
US 2016/0348506 A1    Dec. 1, 2016

Related U.S. Application Data

(60) Provisional application No. 62/167,759, filed on May 28, 2015.

(51) Int. Cl.
  *E21F 1/14*      (2006.01)
  *F16B 7/10*      (2006.01)
  *F16M 11/24*     (2006.01)
(52) U.S. Cl.
  CPC ............... *E21F 1/14* (2013.01); *F16B 7/105* (2013.01)

(58) Field of Classification Search
  USPC .......................................... 405/132; 454/168
  See application file for complete search history.

(56) References Cited

U.S. PATENT DOCUMENTS

| | | | |
|---|---|---|---|
| 3,859,802 A | | 1/1975 | Platner et al. |
| 4,143,991 A | * | 3/1979 | Stafford .............. E21D 23/0095 405/291 |
| 4,274,764 A | * | 6/1981 | Curry .................. E21D 23/0418 405/291 |
| 4,439,064 A | | 3/1984 | van der Gaarden |
| 4,621,951 A | | 11/1986 | Dewson |
| 5,174,682 A | | 12/1992 | Whitfield |
| 5,412,916 A | | 5/1995 | Kennedy et al. |

(Continued)

OTHER PUBLICATIONS

Unistrut_Dec. 15, 2014WM and Unistrut_Dec. 15, 2014; Unistrut®, "Application Showcase", URL http://www.unistrut.us/DB/PDF1/Unistrut_App_Showcase.pdf.*

(Continued)

*Primary Examiner* — Gregory L Huson
*Assistant Examiner* — Elizabeth M. May
(74) *Attorney, Agent, or Firm* — Porter Wright Morris & Arthur LLP

(57) ABSTRACT

A vertically and laterally adjustable frame for a mine ventilation structure having two or more pairs of adjustable height support columns, and a plurality of adjustable length support beams, each support beam mounted to and spanning between a pair of the support columns. A mine overcast and a method of assembling an overcast in an intersection within a mine are also provided, with the overcast including a vertically and laterally adjustable frame, and a plurality of side and ceiling panels mounted to the frame.

21 Claims, 23 Drawing Sheets

(56) References Cited

U.S. PATENT DOCUMENTS

| | | |
|---|---|---|
| 5,466,187 A | 11/1995 | Kennedy et al. |
| 5,879,231 A | 3/1999 | Sisk |
| 6,129,483 A | 10/2000 | Juracko |
| 6,256,946 B1 | 7/2001 | Kennedy et al. |
| 6,264,549 B1 | 7/2001 | Kennedy et al. |
| 7,182,687 B2 | 2/2007 | Kennedy et al. |
| 7,232,368 B2 | 6/2007 | Kennedy et al. |
| 7,267,505 B2 | 9/2007 | Kennedy et al. |
| 8,220,094 B2 | 7/2012 | Kennedy et al. |
| 2003/0129937 A1 | 7/2003 | Kennedy et al. |
| 2003/0143942 A1* | 7/2003 | Kennedy ............. E21F 1/145 454/169 |
| 2004/0067730 A1 | 4/2004 | Kennedy et al. |
| 2006/0105695 A1 | 5/2006 | Kennedy et al. |
| 2006/0172683 A1 | 8/2006 | Kennedy et al. |
| 2015/0322787 A1 | 11/2015 | Helbig et al. |

OTHER PUBLICATIONS

"Kit", Merriam-Webster, URL https://www.merriam-webster.com/dictionary/kit.*

* cited by examiner

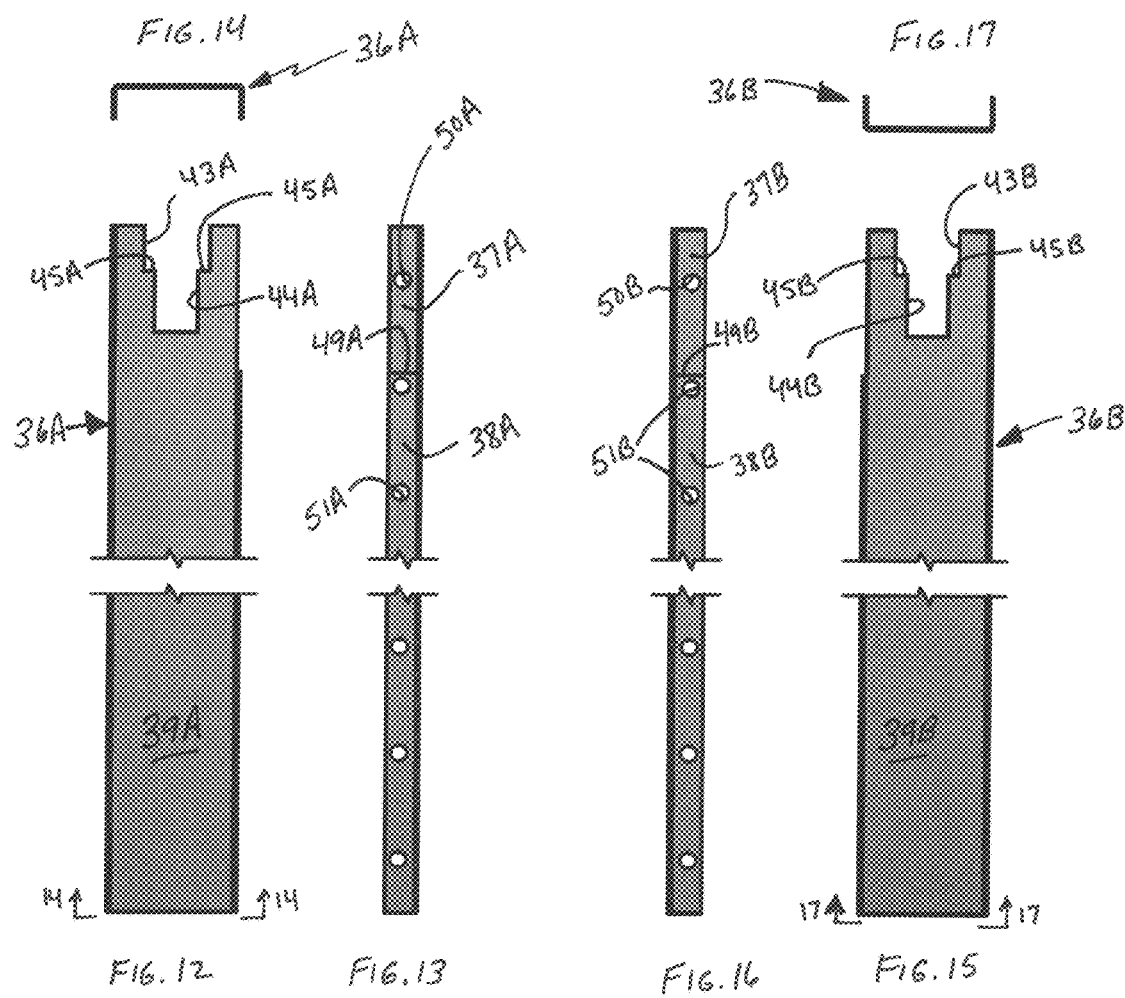
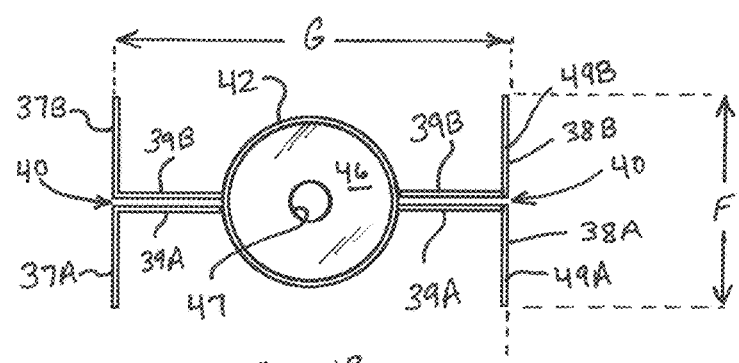

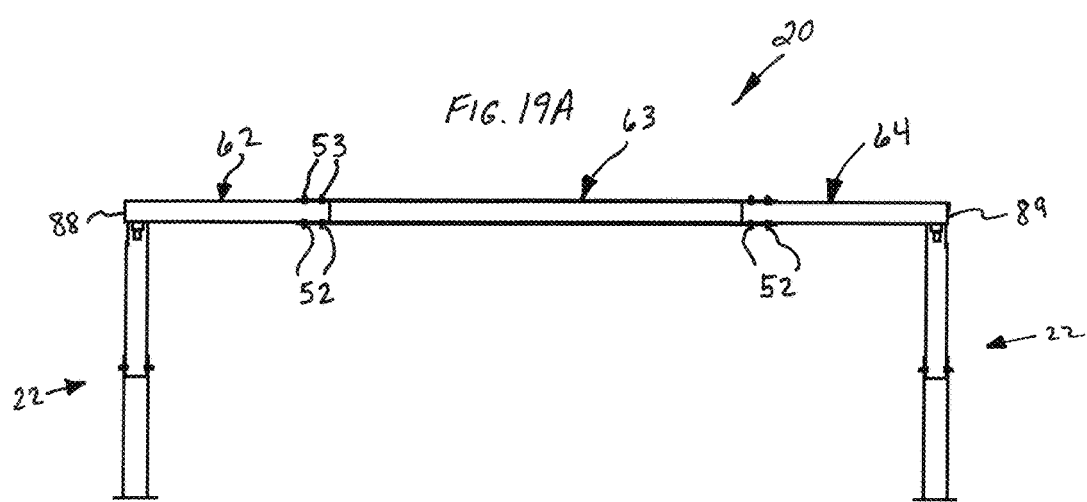
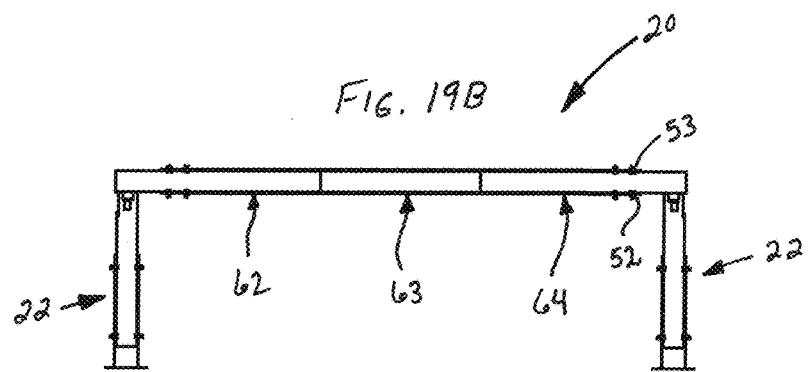

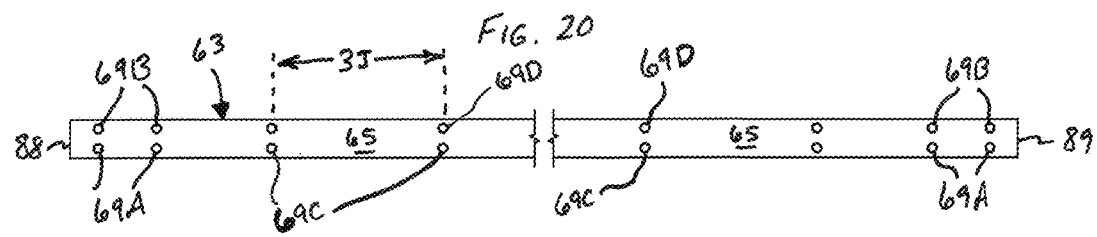
FIG. 20
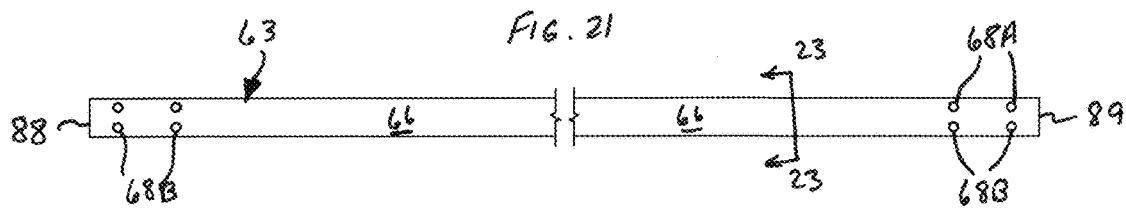
FIG. 21
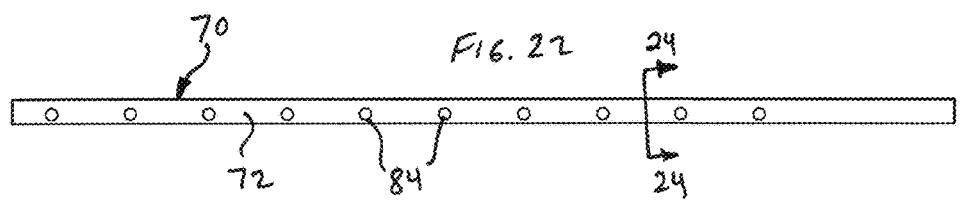
FIG. 22
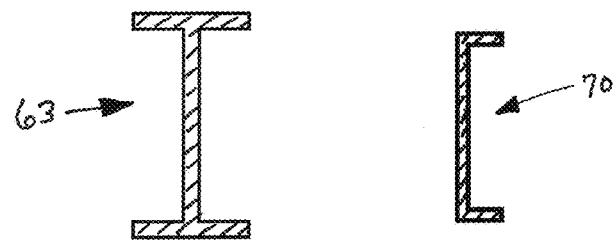
FIG. 23
FIG. 24

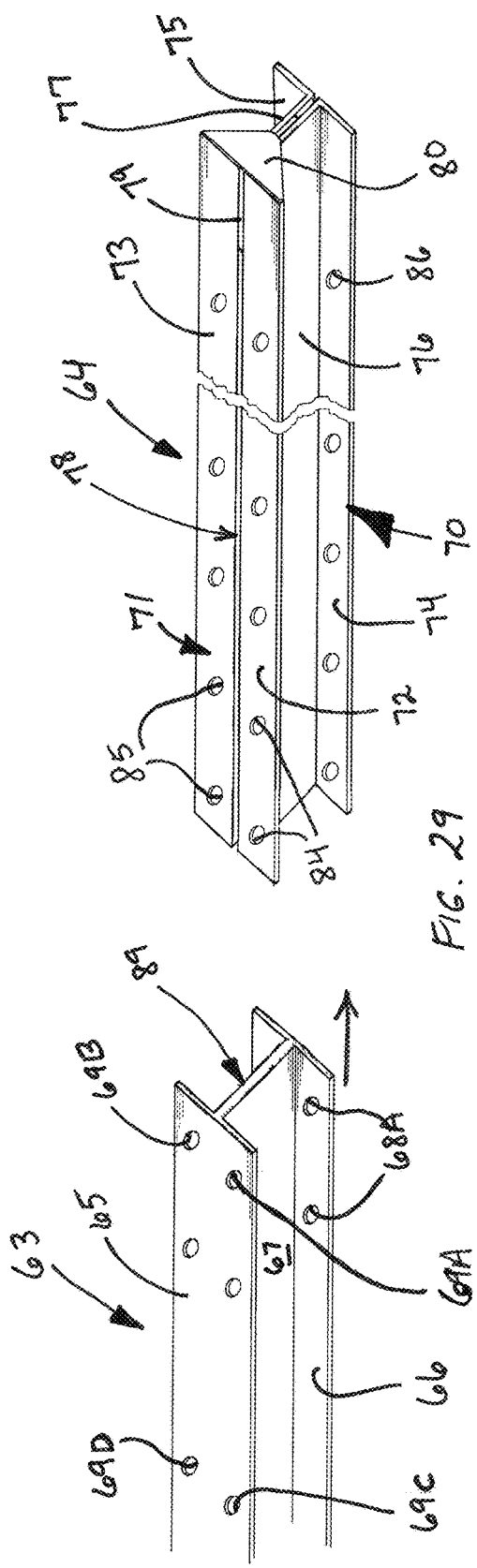
FIG. 29
FIG. 30
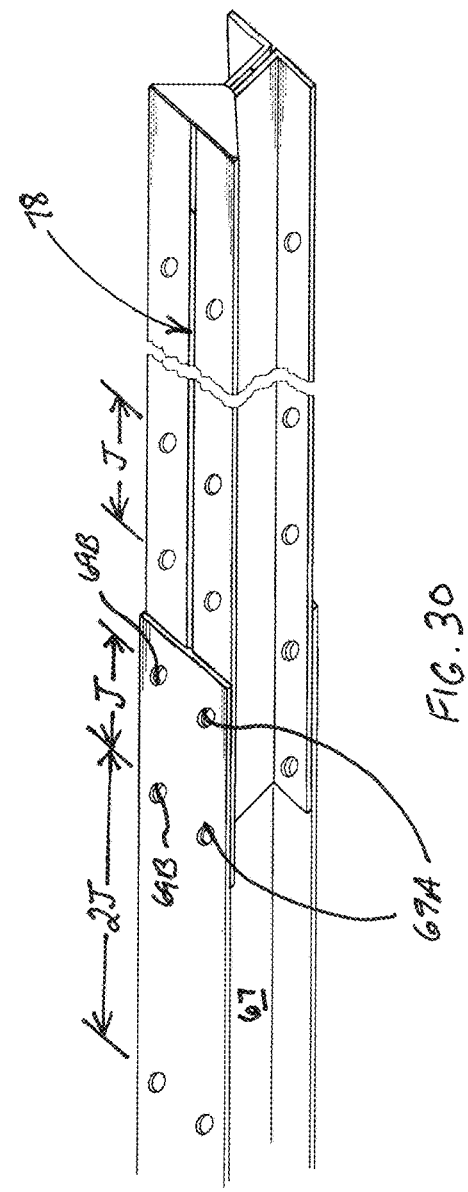

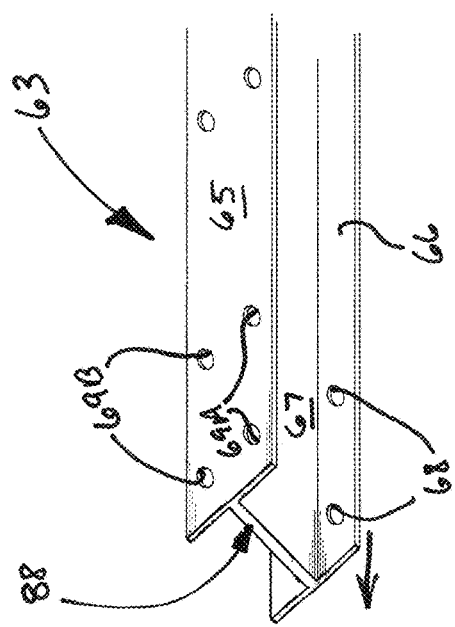
FIG. 31
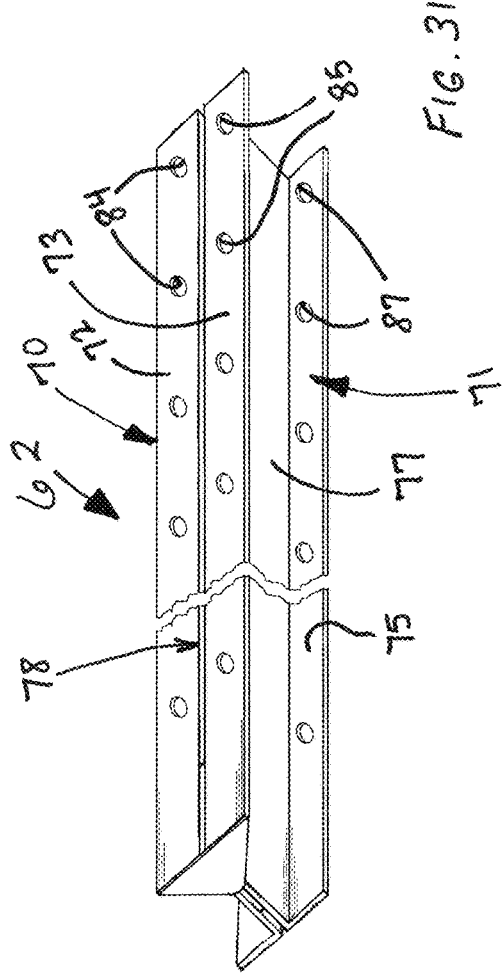
FIG. 32
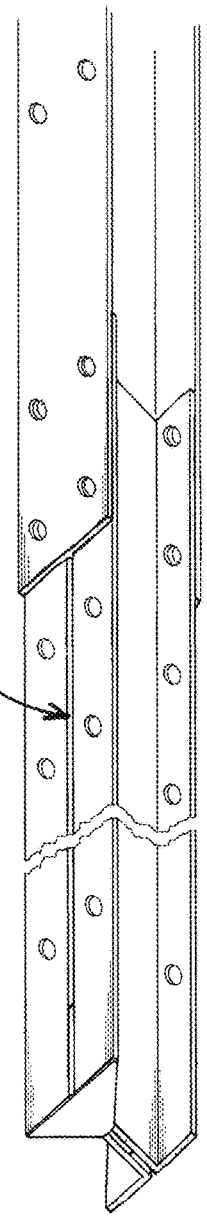

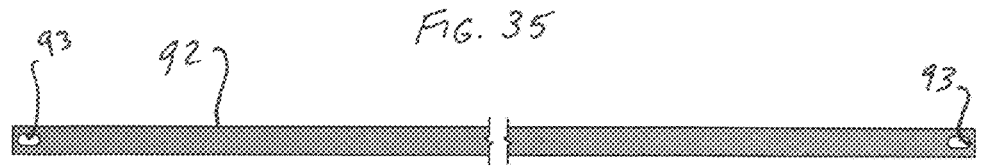
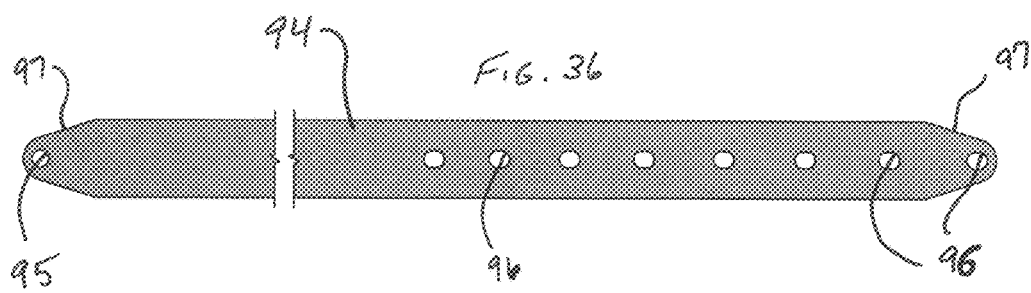
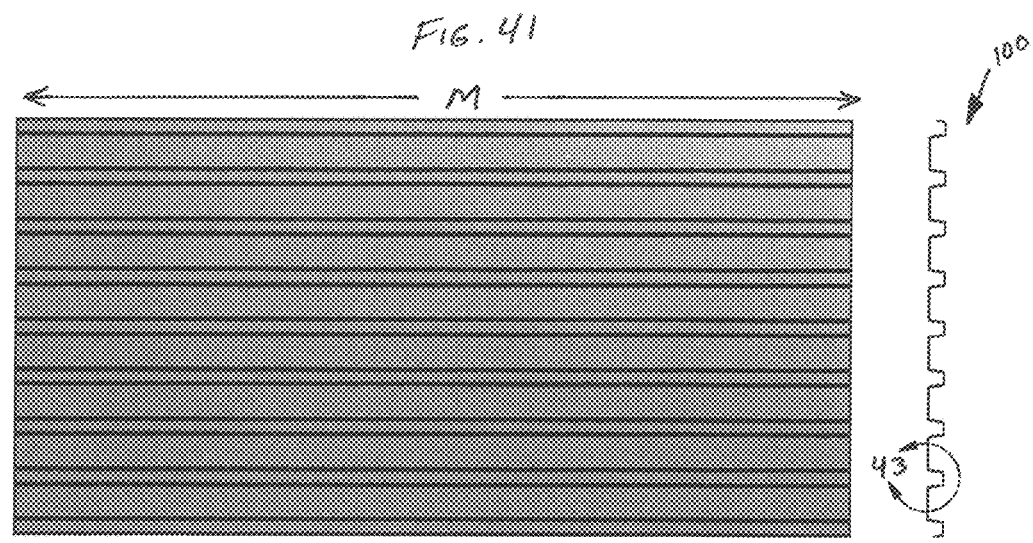
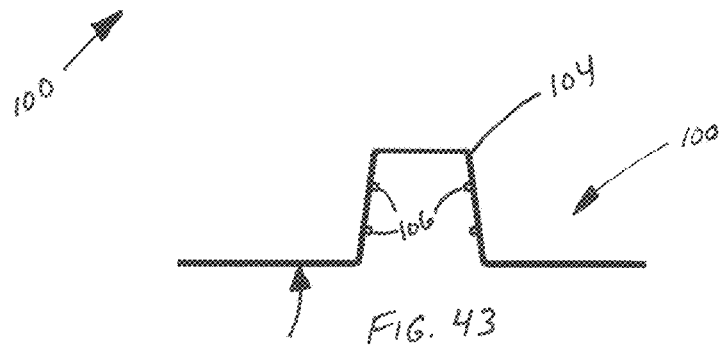

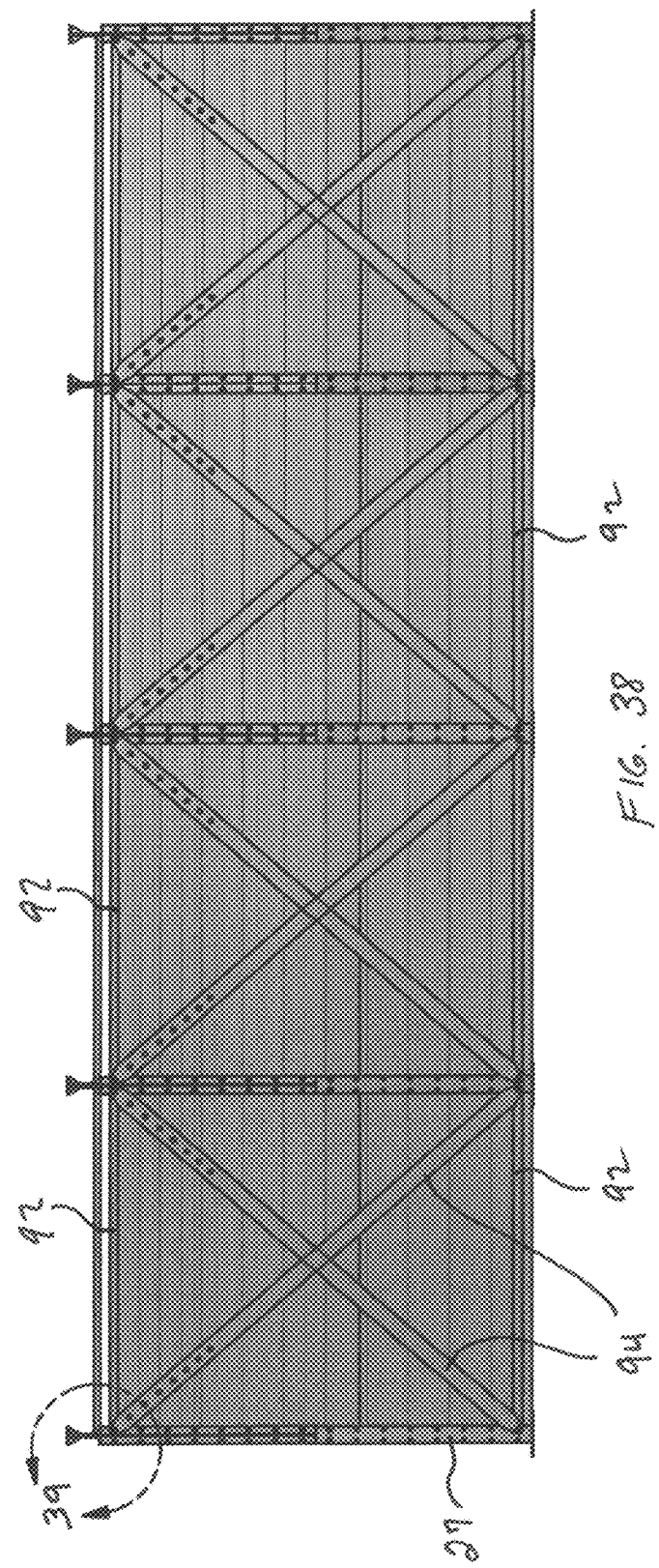

ADJUSTABLE MINE VENTILATION SYSTEM AND METHOD

CROSS REFERENCE TO RELATED APPLICATIONS

This application claims priority to U.S. Provisional Patent Application No. 62/167,759, filed on May 28, 2015, entitled "Adjustable Mine Ventilation System and Method." The entire disclosure of the foregoing provisional patent application is incorporated by reference herein.

BACKGROUND

Underground mining (e.g., coal mining) typically necessitates the cutting of intersecting passageways throughout the mine. These intersecting passageways are often arranged in a grid pattern, with the passageways intersecting at right angles. (In other instances the passageways intersect at angles other than 90 degrees.) In addition to providing access, the passageways are also used for ventilation purposes. Some passageways are used to deliver fresh air into the mine while others to expel contaminated air from the mine. Where a fresh air passageway intersects a contaminated air passageway it is necessary to prevent mixing of the two air streams.

An overcast (also referred to as an undercast) is a structural system that is typically utilized in a mine or tunnel ventilation system. The overcast is constructed in a mine intersection for the purpose of preventing the mixing of the air in two intersecting passageways. For example, overcasts are used to prevent the mixing of ventilation (intake) air flowing through a first passageway and contaminated (exhaust) air flowing through a second passageway that intersects the first. Overcasts, however, can be time-consuming to assemble in place. In addition, not only are mine passageways a variety of shapes and sizes, not only intersections are at right angles. Because overcasts are intended to prevent the mixing of air in intersecting passageways, it is important that the overcast fit properly in the intersection so that sufficient sealing may be provided between the overcast and the mine ribs. Therefore, each overcast is typically sized and configured for the particular intersection in which it will be installed.

While a variety of devices and techniques may exist for providing overcast structures in mines, it is believed that no one prior to the inventors have made or used an invention as described herein.

BRIEF DESCRIPTION OF THE DRAWINGS

While the specification concludes with claims which particularly point out and distinctly claim the invention, it is believed the present invention will be better understood from the following description of certain examples taken in conjunction with the accompanying drawings. In the drawings, like numerals represent like elements throughout the several views.

FIG. 12 depicts a side plan view of the first channel member used in the support column of FIG. 7.

FIG. 13 depicts an outer plan view of the first channel member of FIG. 12.

FIG. 14 depicts a bottom plan view of the first channel member of FIG. 12.

FIG. 15 depicts a side plan view of the second channel member used in the support column of FIG. 7.

FIG. 16 depicts an outer plan view of the first channel member of FIG. 15.

FIG. 17 depicts a bottom plan view of the first channel member of FIG. 15.

FIG. 18 depicts a top plan view of the upper post of the support column of FIG. 7.

FIG. 19A depicts an end view of the assembled frame of FIG. 4, wherein the frame is in its fully extended (maximum height and maximum width) orientation.

FIG. 19B depicts an end view of the assembled frame of FIG. 4, wherein the frame is in its fully retracted (minimum height and minimum width) orientation.

FIG. 20 depicts a top plan view of the central beam section of the frame of FIG. 4.

FIG. 21 depicts a bottom plan view of the central beam section of the frame of FIG. 4.

FIG. 22 depicts a top plan view of a channel member of an outer beam section of the frame of FIG. 4.

FIG. 23 depicts a cross-sectional view of the central beam section of FIG. 21.

FIG. 24 depicts a cross-sectional view of the channel member of FIG. 22.

FIGS. 29-32 depict the assembly and length adjustment of a support beam used in the overcast system of FIG. 1, wherein portions of the central beam section as well as the mounting bolts have been omitted for purposes of clarity.

FIG. 35 depicts a plan view of an alignment bar used in the frame of FIG. 4.

FIG. 36 depicts a plan view of a cross-brace used in the frame of FIG. 4.

FIG. 38 depicts an interior side view of the overcast system of FIG. 37, taken along the line 38-38 thereof.

FIG. 41 depicts a top plan view of a side/ceiling panel used in the overcast system of FIG. 1.

FIG. 42 depicts an end plan view of the side/ceiling panel of FIG. 41.

FIG. 43 depicts an enlarged view of a portion of the side/ceiling panel of FIG. 42.

Figure 1:
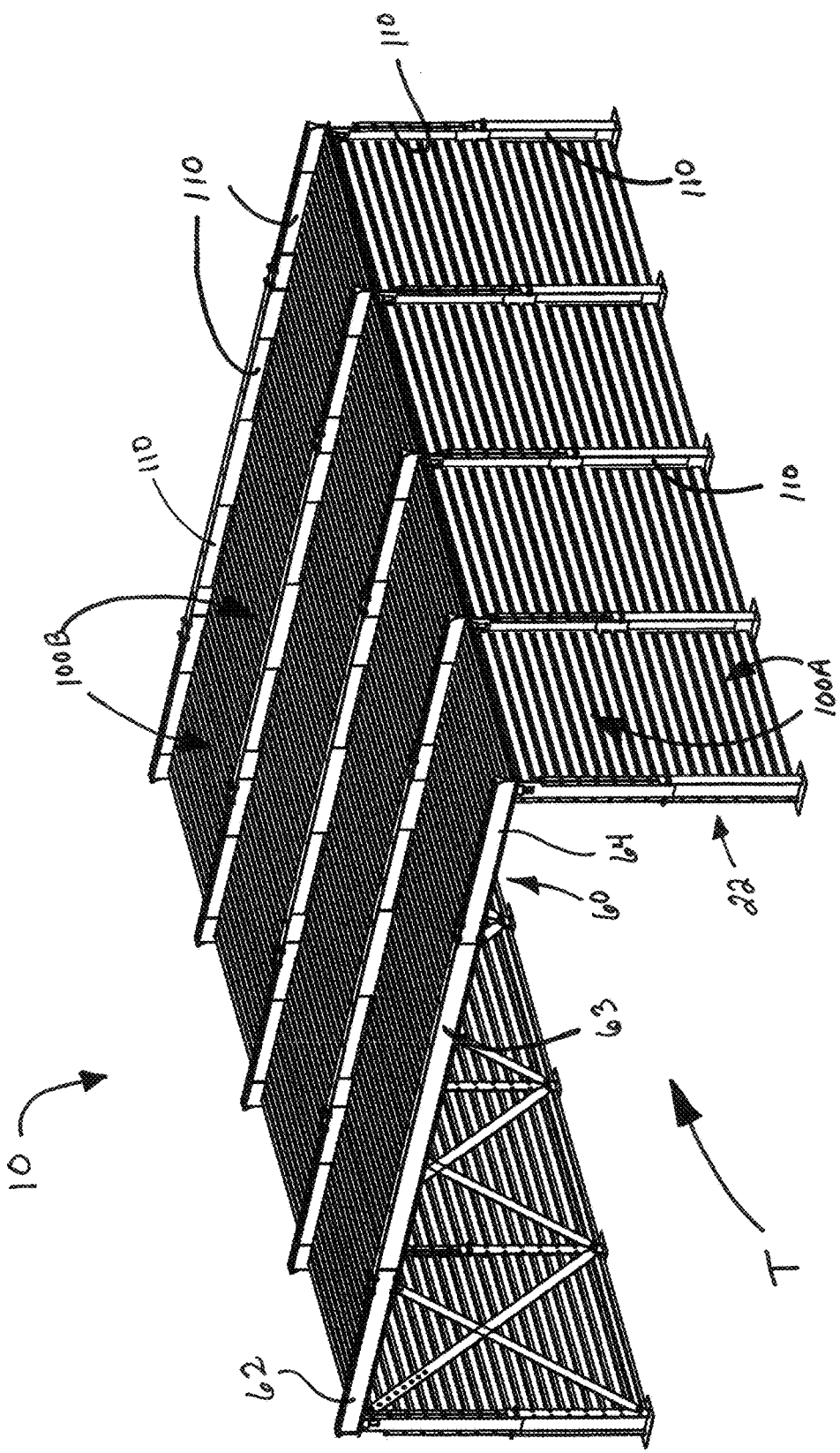
FIG. 1 depicts one embodiment of an assembled overcast system.

The drawings are not intended to be limiting in any way, and it is contemplated that various embodiments of the invention may be carried out in a variety of other ways, including those not necessarily depicted in the drawings. The accompanying drawings incorporated in and forming a part of the specification illustrate several aspects of the present invention, and together with the description serve to explain the principles of the invention; it being understood, however, that this invention is not limited to the precise arrangements shown.

DETAILED DESCRIPTION

The following description of certain examples should not be used to limit the scope of the present invention. Other features, aspects, and advantages of the versions disclosed herein will become apparent to those skilled in the art from the following description, which is by way of illustration, one of the best modes contemplated for carrying out the invention. As will be realized, the versions described herein are capable of other different and obvious aspects, all without departing from the invention. Accordingly, the drawings and descriptions should be regarded as illustrative in nature and not restrictive.

Adjustable mine ventilation systems and methods are described herein. In one embodiment, the ventilation system comprises an overcast structure which is constructed out of an adjustable frame (e.g., structural steel or other metal), along with formed panels (e.g., metal panels) that are affixed to the sides and top of the assembled frame to form the walls and roof deck of the overcast. The overcast is used as a structural form for sprayed concrete or other finishing material, or as a stand-alone overcast. The frame is adjustable vertically (height), laterally (width) and/or diagonally (angle) in order to provide optimal fit in mine intersections, mine entries and other locations requiring a tunnel structure. Embodiments of the adjustable frame are also modular in that the frame, and therefore the overcast or other tunnel structure, can be provided in whatever length is needed simply by adding additional support columns and cross beams (as further described herein) to provide the desired length. Thus, the overcast structure is configured to fit the applicable intersection, as irregularities of the mine or tunnel leads to varying dimensions of intersections, without sacrificing structural integrity.

Not only are the mine ventilation systems described herein adjustable, they are also reusable and reconfigurable. For example, an assembled overcast can be dismantled (in part or completely), removed from the mine intersection, moved to a new mine intersection, and then reassembled and adjusted to fit the new mine intersection.

The adjustable frame of the overcast structure is assembled in place at the intersection, and the frame is then adjusted vertically, horizontally and/or diagonally, as dictated, for example, by the size and shape of the intersection. Thereafter, the side and ceiling panels are mounted to the frame. If necessary or desired, a cementitious sealing composition is then applied to the exterior of the structure in order to provide additional sealing as well as strength, as described in U.S. patent application Ser. No. 14/271,476, filed on May 7, 2014, entitled Mine Ventilation System and Method (hereinafter, "the '476 App."). (The '476 App. is incorporated by reference herein.) For example, as described in the '476 App., shotcrete or gunite is applied to the outer surface of the overcast in order to not only seal the structure, but also to span any gaps between the structure and the ribs and ceiling defining the passageways in which the structure is positioned. In some embodiments, wire mesh is first applied over some or all of the outer surfaces of the side and ceiling panels of the structure to facilitate adherence of the cementitious sealing composition.

In addition, some embodiments also include one or more sealing flanges which extend away from portions of the structure in order to span gaps between the side and/or ceiling panels of the overcast and the ribs and/or ceiling of the mine passageways. In some embodiments, these sealing flanges comprise foraminous preform structures which are affixed to the structure about the ends thereof and thereafter the cementitious sealing composition is applied to the preform structure. In particular embodiments, the preform structures used to fabricate the sealing flanges are formed from foraminous metal structures (e.g., expanded metal panels). The cementitious sealing composition is applied over the expanded metal panels to provide sealing. Embodiments of the ventilation structures and methods described herein take less man hours to build, are safer to construct, and/or provide reduced air leakage.

Figure 2:
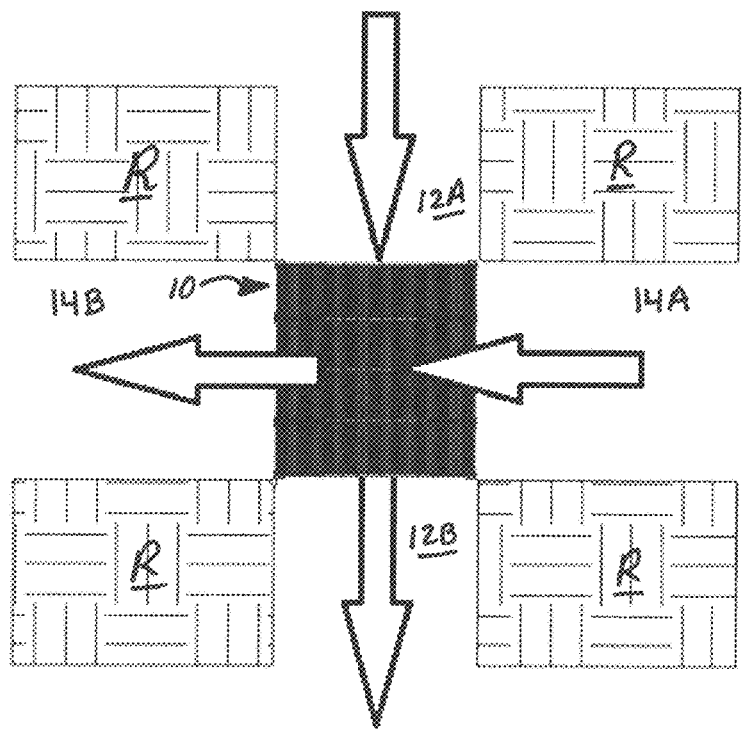
FIG. 2 depicts a top schematic view of the overcast system of FIG. 1, installed at the intersection of two mine passageways within a mine.

FIG. 1 depicts one embodiment of an assembled, uncoated overcast system (10) having opposing sidewalls and a roof spanning between the sidewalls. A tunnel T is thus provided between the sidewalls and beneath the roof, extending between openings located at opposite ends of the overcast system (10). FIG. 2 depicts a top schematic view of overcast system (10) of FIG. 1 installed at the intersection of two mine passageways. The corners of the overcast system (10) are in close proximity to, in contact with or even in sealing engagement with the ribs (R) of the mine passageways as well as portions of the roof of the passageways. Air flowing through the first passageway (12A, 12B) will flow through the tunnel (T) of the overcast system (beneath the roof of the overcast) and air flowing through the second passageway (14A, 14B) will flow over the roof of overcast system (10), and the two streams of air will not mix.

Figure 3:
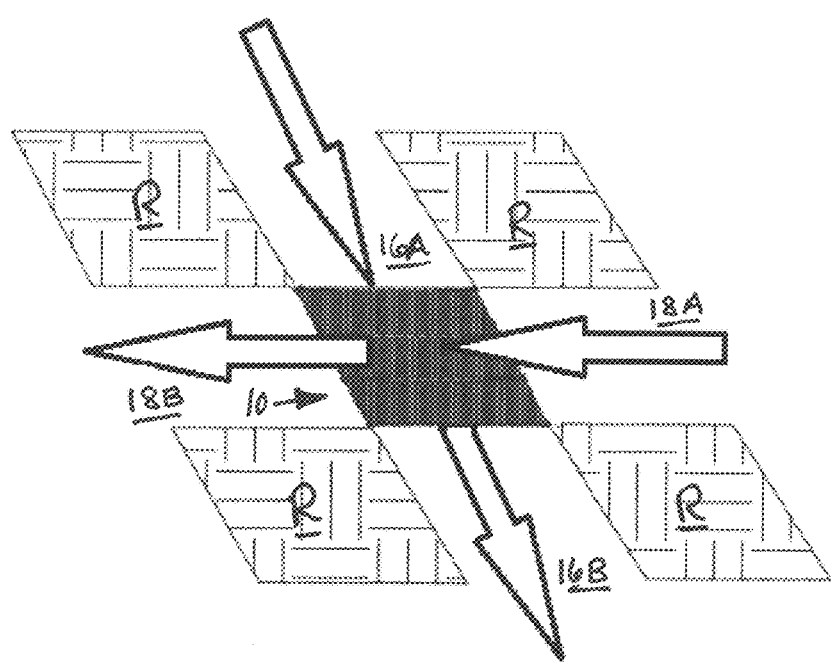
FIG. 3 depicts a top schematic view of the overcast system of FIG. 1, installed at the intersection of two mine passageways within a mine wherein the overcast system has been diagonally adjusted to fit an angled intersection within a mine.

FIG. 3 depicts a top schematic view of overcast system (10) of FIG. 1 installed at an angled intersection of two mine passageways. In this instance, despite the passageways intersecting at an angle of about 60 degrees, overcast system (10) is diagonally adjustable so as to precisely fit an angled intersection such as that shown in FIG. 4. As before, air flowing through the first passageway (16A, 16B) will flow through the tunnel (T) of the overcast system (beneath the roof of the overcast) and air flowing through the second passageway (18A, 18B) will flow over the roof of overcast system (10), and the two streams of air will not mix.

In fact, because some embodiments of the overcast systems described herein can be adjusted vertically, laterally and diagonally, as well as easily lengthened by adding additional pairs of support columns, each of which is spanned by a support beam, these overcast systems can be adjusted to match a variety of intersection shapes. For example, when viewed from the top (e.g., FIGS. 2 and 3), these overcast systems can be adjusted to have nearly any quadrilateral shape such as a rectangle (FIG. 2), a rhomboid (FIG. 3), a rhombus, or a trapezoid. In addition, as further described herein, the frame of embodiments of the overcast systems described herein can be assembled in the intersection in the conventional rectangular arrangement depicted in FIG. 4, then adjusted to the desired shape so as to precisely fit the shape of the intersection and the desired height of the overcast, followed by attachment of the side and ceiling panels (which are cut as necessary to fit the adjusted shape of the overcast). Not only does this allow the same frame to be used for a variety of differently sized and shaped intersections, but assembly of the frame in the intersection within, for example a mine is simplified by adjusting the frame after it has been assembled.

Figure 4:
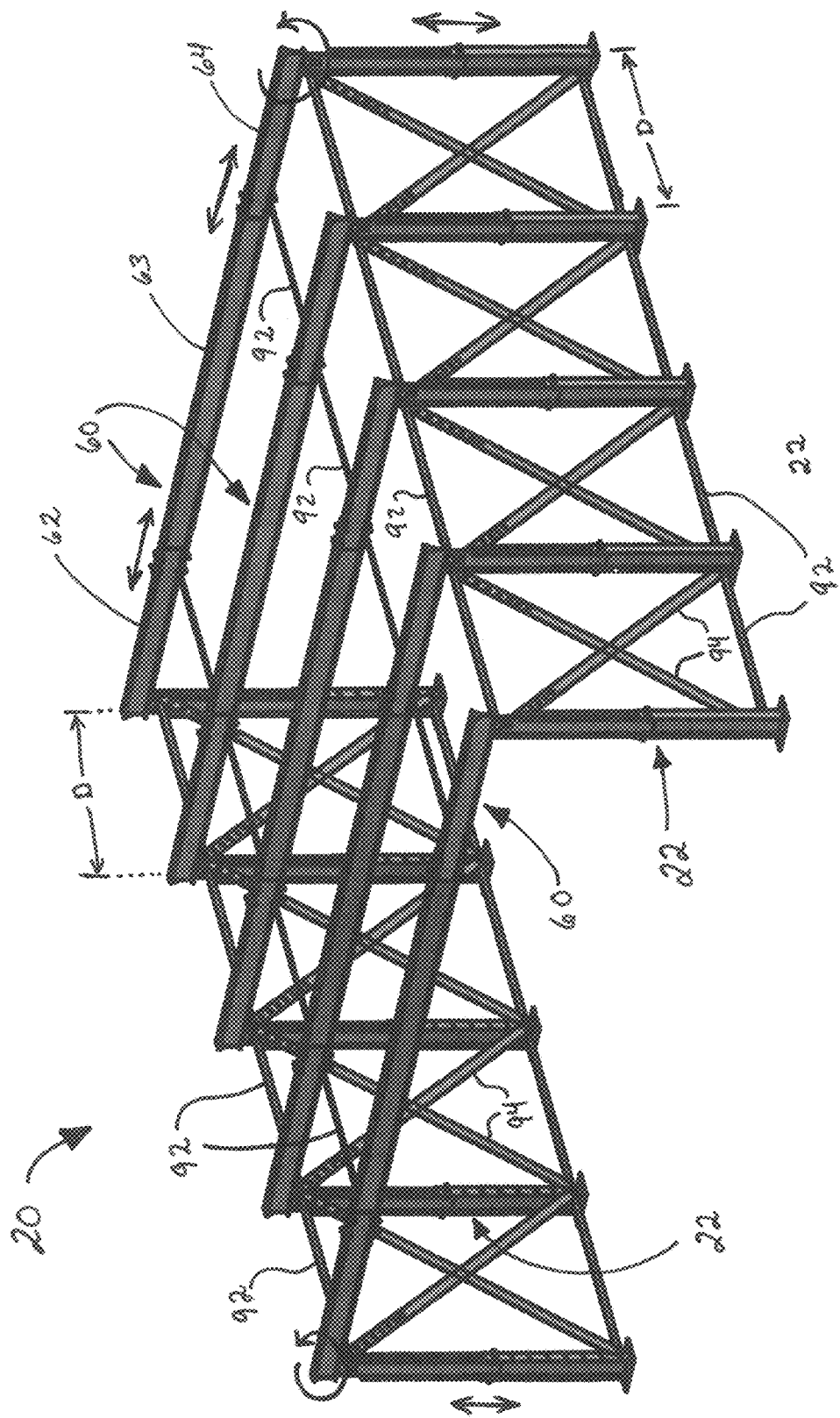
FIG. 4 depicts the assembled frame of the overcast system of FIG. 1.

The overcast system (10) depicted in FIG. 1 includes an adjustable metal frame (20), as shown in FIG. 4. Metal frame (20) is fabricated from structural steel, however various other rigid materials, particularly other metals, may be used. Metal frame (20) generally comprises a plurality of vertically extending, and vertically adjustable support columns (22), a plurality of length-adjustable support beams (60) extending across the width of the metal frame so as to connect opposing pairs of support columns (22) at their upper ends, and, optionally, a plurality of securement members extending between and affixed to adjacent support columns and/or adjacent support beams. In the embodiment shown, the securement members comprise a pair of intersecting cross-braces (94) extending diagonally between adjacent support columns (22), and a plurality of alignment bars (92) extending between adjacent support columns (22) and adjacent support beams (60). Following assembly and adjustment of frame (20), a plurality of side panels (100A) are mounted to the frame between adjacent support columns (22) along the sides of the frame (20), and a plurality of ceiling panels (100B) are mounted to the frame between adjacent support beams along the top of the frame. Panel retention clips (110) are used to hold the side panels (100A) and ceiling panels (100B) in place, as further described herein.

In the particular embodiment shown in FIG. 4, metal frame (20) is assembled using ten support columns (22), five support beams (60), 16 cross-braces (94) and 24 alignment bars (92). It will be understood, however, that any number of pairs of support columns and spanning support beams may be employed, depending on the size of the overcast system needed for a particular mine intersection. The number of side panels (100A) and ceiling panels (100B) used to complete the overcast system (10) shown in FIG. 1 will depend on the completed height and width of the frame (20), as well as width of the side and ceiling panels (100A, 100B) employed. Although the frame (20) is vertically, laterally and diagonally adjustable, the distance (D) between adjacent support columns (22) on either side of the frame (20) and between adjacent support beams (60) is constant. Thus, the side and ceiling panels (100A, 100B) may all have the same length which is slightly less than the distance (D) between adjacent support columns (22) and support beams (60). The width of the side and ceiling panels (100A, 100B) may also be the same, or may vary in order to facilitate installation. During assembly, it will generally be necessary to cut the width of some of the side and ceiling panels (100A, 100B) in order to cover the entirety of the sides and ceiling of the overcast system (10), particularly without any overlap of adjacent side and ceiling panels (100A, 100B).

Figure 5:
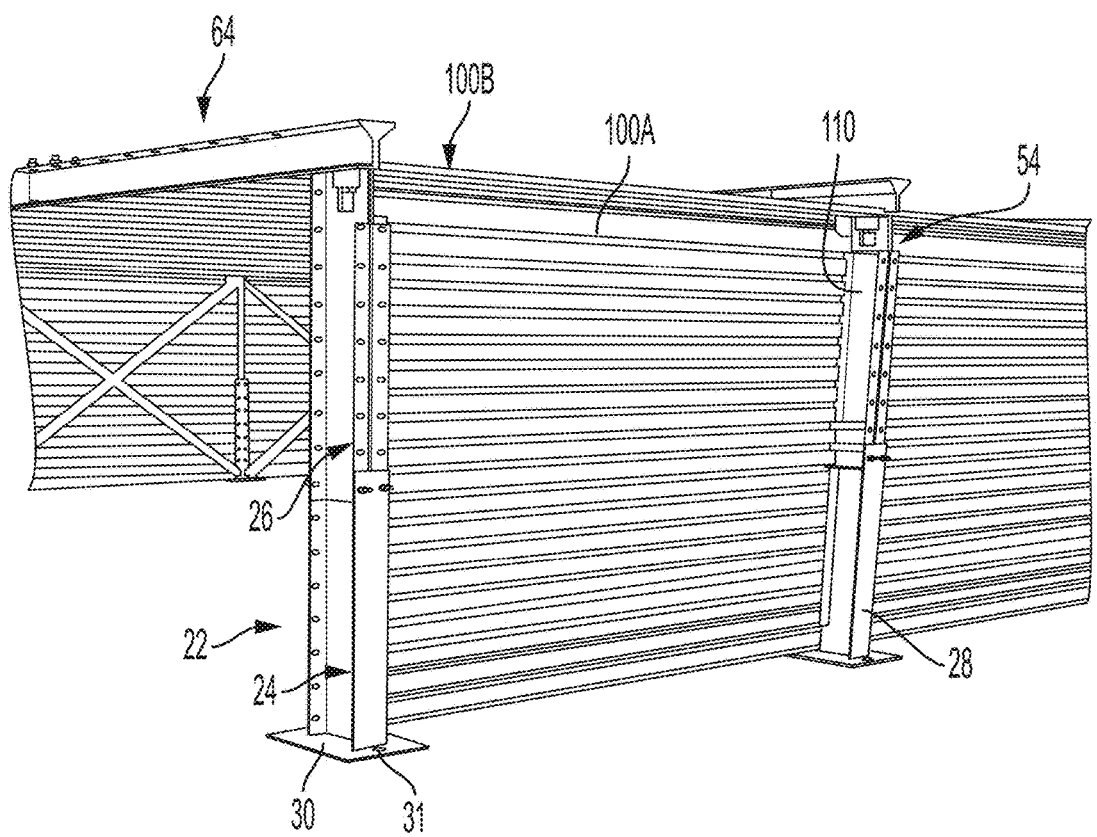
FIG. 5 depicts a perspective view of a portion of the overcast system of FIG. 1, showing one corner thereof.
Figure 6A:
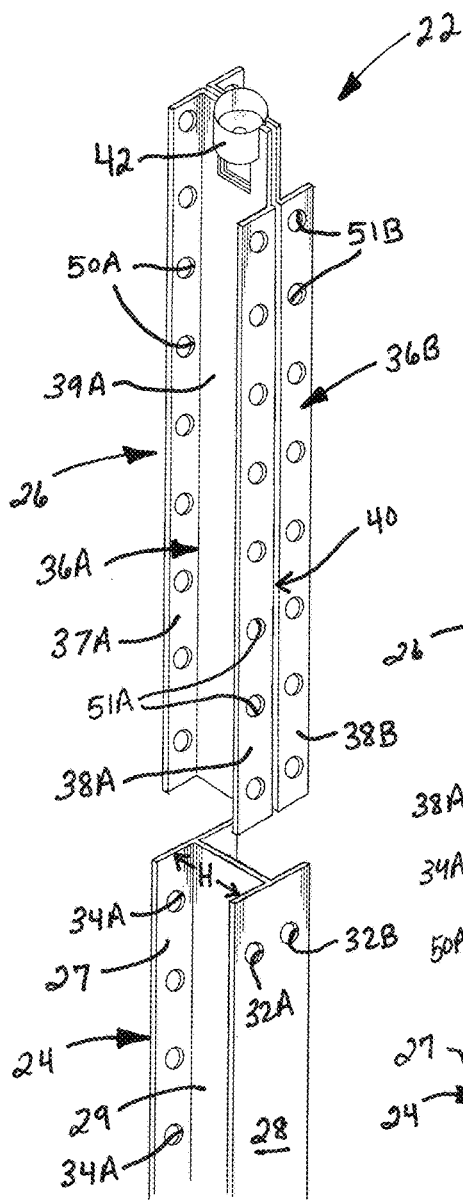
FIGS. 6A-6C depict the assembly and height adjustment of a support column used in the overcast system of FIG. 1, wherein the bottom portion of the lower post as well as the mounting bolts have been omitted for purposes of clarity.
Figure 6B:
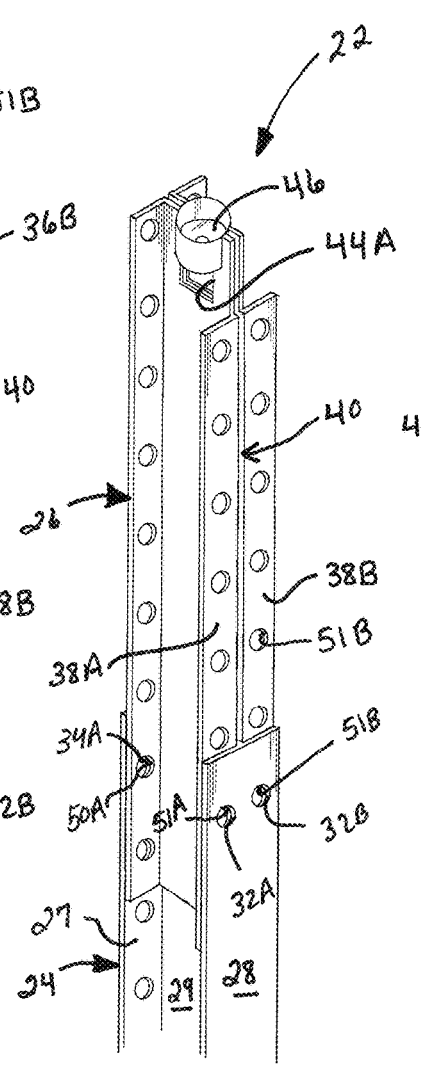
Figure 6C:
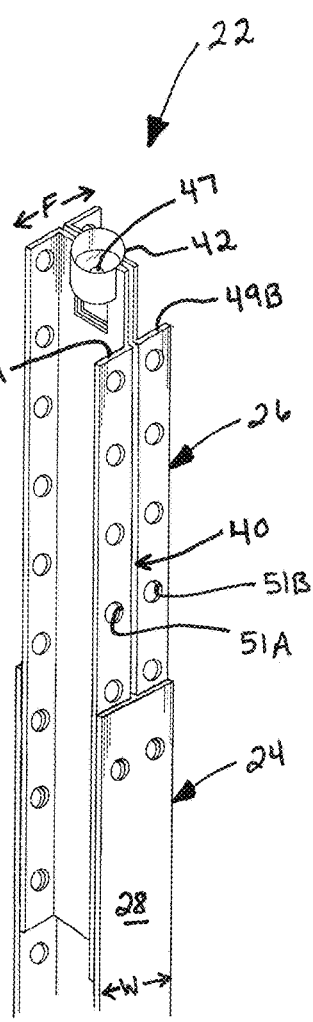

Looking first at the construction of the vertically adjustable support columns (22), FIG. 5 is a perspective view of a portion of overcast system (10), showing one corner thereof. FIGS. 6A-6C depict the assembly and height adjustment of a support column, wherein the height of the support column (22) has been lowered in FIG. 6C as compared to FIG. 6B. Each support column (22) is adjustable in height, and comprises a first, or lower post (24) and a second, or upper post (26).

Lower post (24) comprises an I-beam having an inner and outer flanges (27, 28) joined by a web (29). As used herein, the term "I-beam" includes H-beams as well as wide flange beams (also known as "W-beams") and equivalent structures. Lower post (24) is supported at its lower end by a base plate (30) attached thereto (e.g., by welding). One or more apertures (31) are provided in base plate (30) and may be used to secure the base plate (30) to mine floor (or other surface) using, for example, masonry or concrete anchors.

Figure 7:
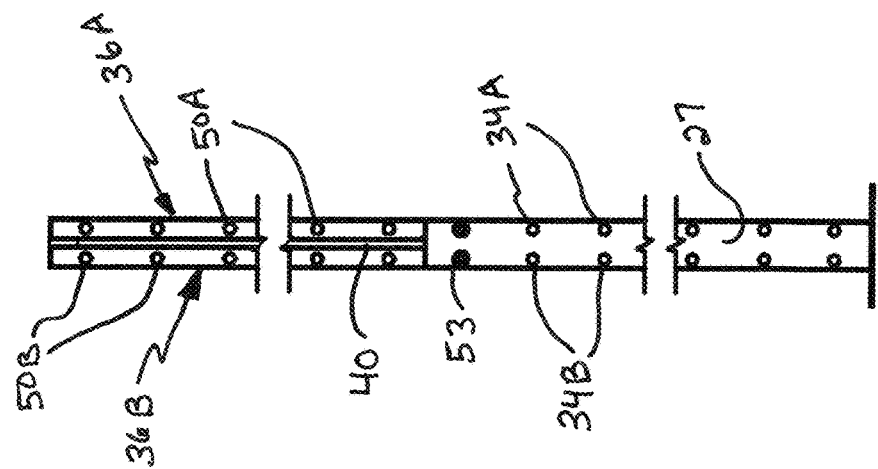
FIG. 7 depicts an inner plan view of an assembled support column.

Lower post (24) further includes a plurality of apertures in its inner and outer flanges (27, 28) for securing the upper and lower posts (24, 26) to one another. A pair of apertures (32A, 32B) are provided on outer flange (28) adjacent the upper end of the lower post (24), spaced laterally from either side of the web (29) as shown and extending through the thickness of the outer flange (28). Two columns of vertically aligned apertures (34A, 34B) are provided on inner flange (27), equally spaced from one another along the length of the inner flange (27) and extending through the thickness of the inner flange (27). The two columns of apertures (34A, 34B) are spaced laterally from either side of the web (29), as best seen in FIG. 7. The apertures (32A, 32B, 34A, 34B) are arranged and configured to be alignable with corresponding apertures on flanges of bifurcated upper post (26), as further described below.

As best seen in FIG. 6A, upper post (26) is bifurcated, comprising a pair of elongate channel members (36A, 36B) secured with respect to one another in spaced-apart relationship such that a slot is provided between their respective webs along a majority of their lengths. As discussed below, the web (29) of the lower post (24) is slidably received within this slot, while the channel members (36A, 36B) are each slidably received between the inner and outer flanges (27, 28) of the lower post (24) on opposite sides of the web (29) of the lower post (24).

Each channel member (36A, 36B) generally comprises a structural channel, or C-beam, and has an inner flange (37A, 37B) and an outer flange (38A, 38B), with the inner and outer flanges extending away from one side of a web (39A, 39B). Thus, as seen in the top plan views of FIGS. 14 and 17, channel members (36A, 36B) have a C-shaped cross-section. As used herein, the term "structural channel" includes C-beams, sometimes referred to as "U-beams," and equivalent structures.

Channel members (36A, 36B) are maintained adjacent one another such that their respective webs (39A, 39B) are in a facing relationship with a slot (40) provided between the webs (39A, 39B) along nearly the entire length of the bifurcated upper post (26). The channel members (36A, 36B) can be secured with respect to one another and maintained in this spaced apart relationship in a variety of ways, such as affixing (e.g., by welding) one or more spacer plates between the webs (39A, 39B) of the channel members (36A, 36B) at or adjacent their upper ends.

Figure 10:
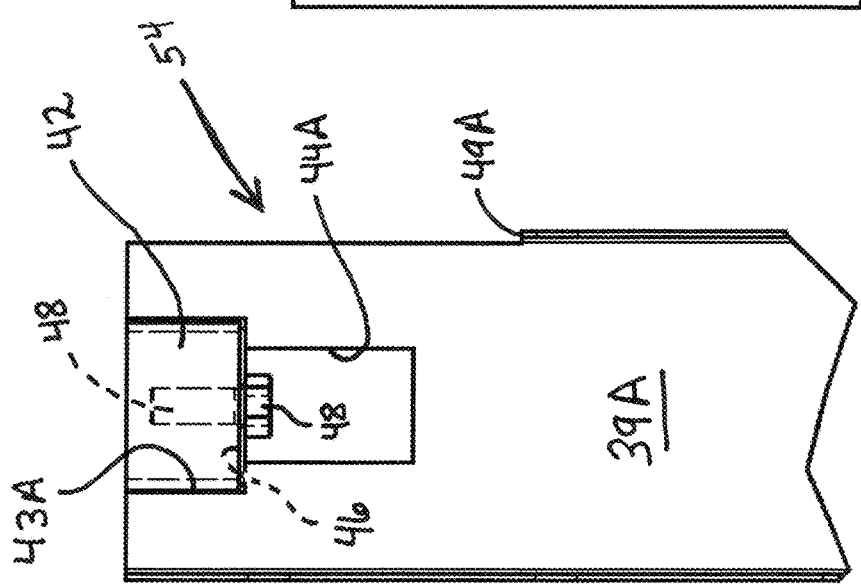
FIG. 10 depicts an enlarged view of an upper portion of FIG. 8.

In the embodiment shown, a support beam leg receiver (42) is secured (e.g., by welding) within a stepped cutout provided in the upper end of webs (39A, 39B) of channel members (36A, 36B). Each stepped cutout includes an upper cutout (43A, 43B) extending downwardly from the upper endwall of the web (39A, 39B), and a narrower lower cutout (44A, 44B) extending downwardly from the upper cutout (43A, 43B). A pair of shoulders (45A, 45B) are thus provided on opposite sides of the stepped cutouts, between the upper and lower cutout portions (see FIGS. 12 and 15). Support beam leg receiver (42) is secured within the upper cutouts (43A, 43B), on shoulders (45A, 45B), as best seen in FIGS. 6 and 10.

Figure 8:
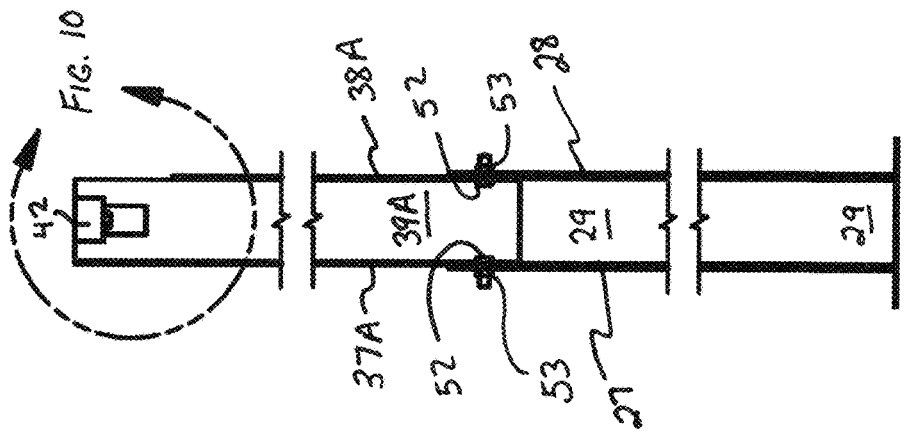
FIG. 8 depicts a side plan view of the assembled support column of FIG. 7.
Figure 47:
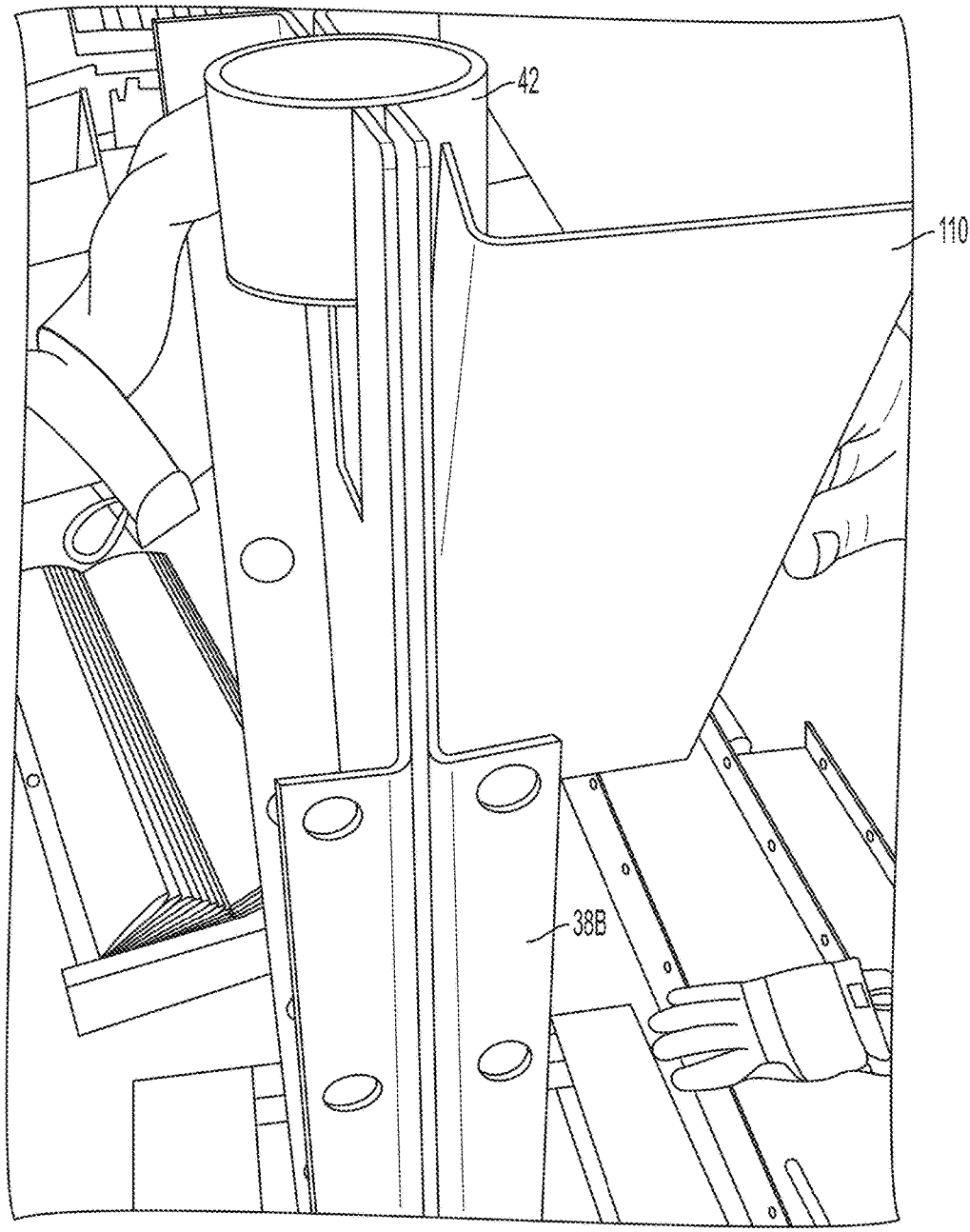
FIG. 47 depicts the insertion of a side panel into the opening provided at the upper end of a support column.

In the exemplary embodiment shown, support beam leg receiver (42) comprises a cylindrical cup having an apertured bottom wall (46), with a centrally located aperture (47) in the bottom wall (46). The uppermost edge of the leg receiver (42) is flush with the uppermost edge of the channel members (36A, 36B), as best seen in FIGS. 8 and 10. As further described herein, support beam leg receiver (42) is sized and configured to rotatably receive a cylindrical support beam leg that extends downwardly from the bottom of a support beam (60) adjacent either end of the support beam (60). A fastener, depicted as a threaded bolt (48), extends through the aperture (47) in bottom wall (46) and is used to secure the support beam leg within the leg receiver (42) in order to secure one end of a support beam (60) to the upper end of bifurcated upper post (26). Lower cutout (44A, 44B) is provided in the web (39A, 39B) in order to allow insertion of threaded bolt (48) into aperture (47), but also to allow for the tightening of bolt (48) (e.g., using a wrench). Similarly, outer flanges (38A, 38B) do not extend to the uppermost end of the channel members (36A, 36B) and beam leg receiver (42). Instead, outer flanges (38A, 38B) extend from the bottom of the channel members (36A, 36B) to a point just below the bottom of lower cutouts (44A, 44B). Thus, as best seen in FIG. 10, the upper end (49A, 49B) of outer flange (38A, 38B) is spaced below the bottom of lower cutout (44A, 44B). In this manner, an opening (54) is provided in order to facilitate the insertion of panel retention clips (110), as further described herein and as depicted in FIG. 47.

Bifurcated upper post (26) further includes a plurality of apertures in the inner and outer flanges (37A, 37B, 38A, 38B) for variably securing the upper posts (26) to the lower post (24). A column of vertically aligned apertures (50A, 50B) is provided on each of inner flanges (37A, 37B), with the plurality of apertures in each column equally spaced from one another along the length of the inner flanges (37A, 37B) and extending through the thickness of the inner flanges. The two columns of apertures (50A, 50B) are also aligned with one another such that pairs of horizontally aligned apertures (50A, 50B) are provided along the length of the upper post (26), with an aperture of each horizontally aligned pair located on either side of slot (40), as best seen in FIG. 7. The two columns of apertures (34A, 34B) are spaced laterally from either side of the web (29), as best seen in FIG. 7. A second column of vertically aligned apertures (51A, 51B) is provided on each of outer flanges (38A, 38B), with the plurality of apertures in each column equally spaced from one another along the length of the inner flanges (38A, 38B) and extending through the thickness of the inner flanges. The second column of apertures (51A, 51B) are arranged and configured similar to the first column of apertures (50A, 50B), although one fewer aperture (51A, 51B) is provide on outer flanges (38A, 38B) due to the shortening of the outer flanges described above.

The width of the slot (40) provided between the webs (39A, 39B) of the channel members (36A, 36B) is slightly greater than the thickness of the web (29) of the lower post (24) such that the web (29) may be slidably received within the slot (40) with minimal play. For example, the width of slot (40) in some embodiments is no more than ⅛" greater than the thickness of the web (29), no more than 1⁄16" greater, or no more than 1⁄32" greater. In the particular embodiment shown, lower post (24) comprises a conventional steel W 8×13 wide flange I-beam. Thus, the thickness of web (29) is 0.230", and the width of the slot (40) is approximately ¼" (i.e., 0.02" greater).

The outer width (G) (see FIG. 18) of each of the channel members (36A, 36B) is slightly less than the interior depth (H) (see FIG. 6A) (i.e., the width of the channel formed by the opposing flanges and the web) of the lower post (24). Thus, as web (29) of lower post (24) is slidably received within the slot (40) of the bifurcated upper post (26), portions of the channel members (36A, 36B) are slidably received between the flanges (27, 28) of the lower post (24), on opposite sides of the web (29). For example, the outer width (G) of each of the channel members (36A, 36B) in some embodiments is no more than ¼" less than the interior depth (G) of the lower post (24), or no more than ⅛" less. In the particular embodiment shown, since lower post (24) comprises a conventional steel W 8×13 wide flange I-beam, the interior depth (G) of the lower post (24) is 7.47", and the outer width (G) of each of the channel members (36A, 36B) is approximately 75⁄16" (7.3125").

Figure 11:
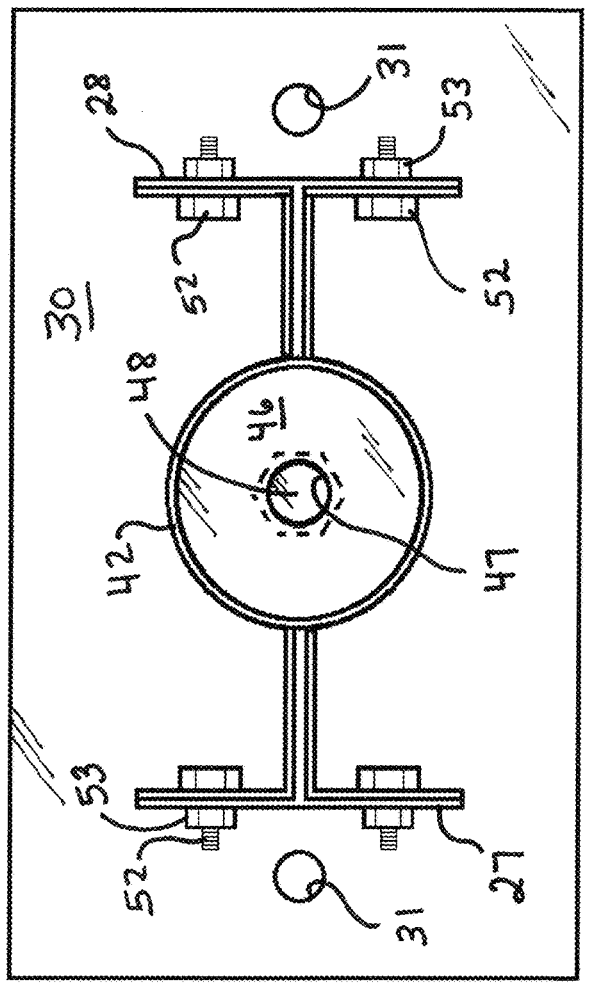
FIG. 11 depicts a top plan view of the assembled support column of FIG. 7.

As best seen in the top plan view of FIG. 18, bifurcated upper post (26) comprising a pair of elongate channel members (36A, 36B) secured with respect to one another in spaced-apart relationship has an I-shape cross-section approximating that of an I-beam. In other words, bifurcated upper post (26) essentially comprises an I-beam having a pair of webs (39A, 39B) in facing, spaced-apart relationship. This I-beam configuration has a total flange width (F) (see FIGS. 6C and 18) which is merely the sum of the width of the flanges on each channel member (36A, 36B) plus the width of the slot (40) between the webs (39A, 39B). In the embodiment shown, the total flange width (F) is approximately equal to the width of the flanges of lower post (24), as best seen in FIG. 11. In other embodiments, however, the total flange width (F) is greater than the width of the flanges of lower post (24), while in still further embodiments the total flange width (F) is less than the width of the flanges of lower post (24).

In order to assemble each support column (22) in a mine intersection or other location, lower post (24) is placed in an upright position. As best seen in FIG. 6A, bifurcated upper post (26) is positioned above the lower post (24), and then slid onto the upper end of the lower post (24) such that web (29) is received within the slot (40) and the lower end portions of the first and second channel members (36A, 36B) are received between the flanges (27, 28) of the lower post (24) on opposite sides of the web (29). The apertures on the flanges of the lower and upper posts (24, 26) are configured to align with one another as the upper post (26) is slid onto the lower post (24) at various support column heights. Thus, the spacing between adjacent, vertically aligned apertures on a flange is generally constant, as is the lateral position of the apertures on each flange. In this manner, and as best seen in FIGS. 6B and 6C, the apertures (32A, 32B) on outer flange (28) of lower post (24) are alignable with a pair of adjacent apertures (51A, 51B) on outer flanges (38A, 38B) of the channel members (36A, 36B). At the same time, the apertures (34A, 34B) on inner flange (27) of lower post (24) are alignable with a pair of adjacent apertures (50A, 50B) on inner flanges (37A, 37B) of the channel members (36A, 36B).

With the apertures aligned in the manner shown in FIGS. 6A and 6B, fasteners such as threaded bolts (52) are inserted through aligned apertures and secured in place using a threaded nut (53) (see FIG. 11). It will be understood that other types of fasteners may be used for this purpose such as rivets, and the like. In the case of threaded bolts (52), in the embodiment shown the head of the bolt (52) is positioned on the interior side of the channel member (36A, 36B) and the nut (53) is threaded onto the bolt (52) on the outside of the support column (22) and tightened against the flange (27, 28) of the lower post (24) in order to secure the lower and upper posts (24, 26) to one another at the desired height. Orienting the bolts (52) and nuts (53) in this manner facilitates tightening of the nuts (53) since there are no flanges to interfere with nut tightening.

Figure 9:
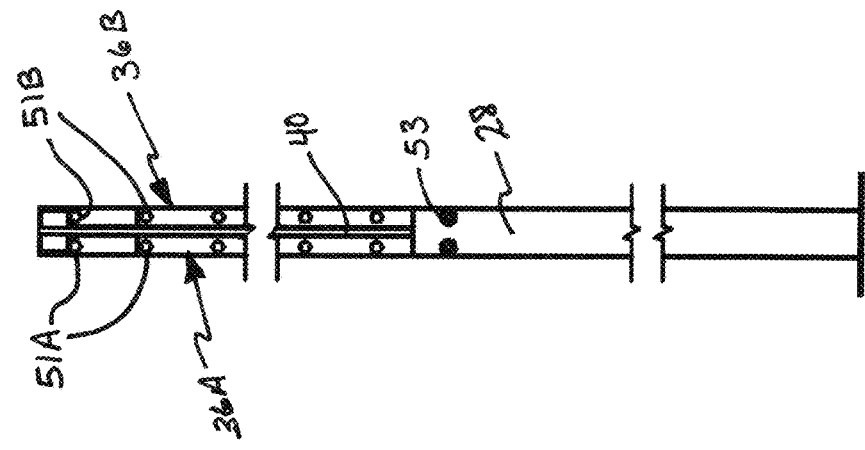
FIG. 9 depicts an outer plan view of the assembled support column of FIG. 7.

As seen in FIGS. 7-9, in the exemplary embodiment shown four threaded bolts (52) are used, two extending though each flange (27, 28) of lower post (24) and the corresponding flanges of the channel members (36A, 36B). However, depending on the height of the support column (22) (i.e., how far bifurcated upper post (26) is slid onto lower post (24)), there may be more than two pairs of aligned apertures on the inner flanges (27, 37A, 37B). For example, in FIG. 6B there are a total of four pairs of aligned apertures on the inner flanges (27, 37A, 37B), and in FIG. 6C there are a total of three pairs of aligned apertures on the inner flanges (27, 37A, 37B) due to the fact that the upper post (26) is slid further downward with respect to lower post (24). In these instances, more than two threaded bolts (52) (or other fasteners) can be used on the inner flanges in order to further secure the lower and upper posts (24, 26) to one another. For example, in FIG. 6B as many as six threaded bolts and nuts (52, 53) can be used (two through the outer flanges and four through the inner flanges), and in FIG. 6C as many as eight threaded bolts and nuts (52, 53) can be used (two through the outer flanges and six through the inner flanges).

The support columns (22) are thus constructed in a manner which allows for the adjustment of column height while also providing an I-beam cross-sectional shape throughout the entire length of the support column (22). In other words, adjustability is provided without significantly sacrificing strength or rigidity. It will also be understood that the arrangement of the lower and upper posts (24, 26) of the support columns (22) can be reversed such that the lower post is bifurcated, comprising a pair of channel members secured (e.g., to a base plate (30)) in a spaced-apart relationship, and the upper post comprises an I-beam configured such that the web of the I-beam is slid into the slot provided between the channel members of the lower post.

It is also contemplated that the support columns may be constructed similar to the support beams (60), further described below. In this alternative arrangement, each support column includes a bifurcated lower post, an I-beam middle post, and a bifurcated upper post. This alternative arrangement will be better understood in light of the description of the support beams (60) below.

Turning to the support beams (60), the ends of each elongate support beam (60) are adjustably secured to the upper end of a support column (22), as best seen in FIG. 4. As further described herein beam legs extend downwardly from a bottom surface of the support beam (60) at each end thereof, and each is received in a beam leg receiver (42) at the upper end of a support column (22). The beam legs are configured to allow for rotational adjustment within the beam leg receiver (42), thus allowing for diagonal adjustment of the frame (20). In addition, each support beam (60) is adjustable in length while still providing an I-beam cross-sectional shape throughout the entire length of the support beam (60), thereby providing adjustability without significantly sacrificing strength or rigidity of the support beams (60).

As shown in FIG. 19A, each support beam (60) comprises a pair of outer beam sections (62, 64), and a central beam section (63) extending between the outer beam sections (62, 64). Central beam section (63) comprises an I-beam having an upper and lower flanges (65, 66) joined by a web (67). Central beam section (63) further includes a plurality of apertures in its upper and lower flanges (65, 66) for securing the central beam section (63) to the outer beam sections (62, 64). Two pairs of apertures (68) are provided on lower flange (66) on opposite sides of web (67), adjacent each end of central beam section (63) (for a total of eight apertures (68) in lower flange (66)), extending through the thickness of the lower flange (66).

Four apertures (69A, 69B) are provided on upper flange (65), in spaced apart relationship, adjacent the left and right ends (88, 89) of the central beam section (63), and extending through the thickness of the upper flange (65) (see FIG. 20). In the embodiment shown, two additional rows of horizontally (i.e., laterally, across the width of the flange) aligned apertures (69C, 69D) are provided on upper flange (65), in spaced apart relationship along the length of the upper flange (65), inward of apertures (69A, 69B) adjacent the right and left ends of the upper flange (65) (see FIG. 20). The end apertures (69A, 69B) as well as the two additional rows of apertures (69C, 69D) are spaced laterally from either side of the web (67), as best seen in FIGS. 20 and 29.

In the lower flange (66) of the central beam section (63), only four apertures (68A, 68B) are provided adjacent the left and right ends (88, 89) of the central beam section (63) (a total of eight apertures in the lower flange (66)). The apertures (68A, 68B) extend through the thickness of the lower flange (66), and each is vertically aligned with an aperture (69A, 69B) in the upper flange (65), as shown (see FIG. 21). The apertures (68A, 68B, 69A, 69B) are arranged and configured to be alignable with corresponding apertures on flanges of first and second bifurcated beam sections (62, 64), as further described below.

While the spacing between adjacent apertures (69A-69C, 69B-D) in each row of apertures in the upper flange (65) may be the same (i.e., similar to apertures (51A, 51B) in bifurcated upper post (26)), in the embodiment shown the spacing between adjacent apertures in each row increases towards the middle of the central beam section (63). Thus, as shown in FIG. 30, the distance between adjacent outer apertures (69A-69A, 69B-69B) of a row on each end of the central beam section (63) is J, and the distance between the second and third apertures (69A-69C, 69B-69D) is 2J (i.e., twice the distance (J)), and the distance between the third and fourth apertures (69C-69C, 69D-69D) is 3J (i.e., three times the distance (J)). Subsequent spacings between additional apertures (69C, 69D) are, in the embodiment shown, 3J (see FIG. 33). The reason for this spacing arrangement is that only the outer apertures (69A, 69B) in the upper flange (65) are used for adjustably securing the central beam section (63) to the outer beam sections (62, 64). The additional apertures (69C, 69D) in the upper flange (65) are provided for the attachment of various optional features and peripheral components such as stairs which need to be bolted to the top of the overcast, or rebar connected to the top (i.e., support beams) of the overcast as part of a brow wall frame. By providing these additional apertures during fabrication of the support beams, installation is simplified and the supplemental apertures (69C, 69D) can be more precisely located.

Since the spacing between adjacent apertures on the flanges of the first and second bifurcated beam sections is a constant distance J (see FIG. 30), the length of the support beam (60) may be shortened at each end thereof in increments of the J distance (e.g., 6 inches) while still using eight fasteners to securely attach each end of central beam section (63) to one of the outer bifurcated beam sections (62, 64) (four fasteners through each flange, at each end of the central beam section).

Figure 28:
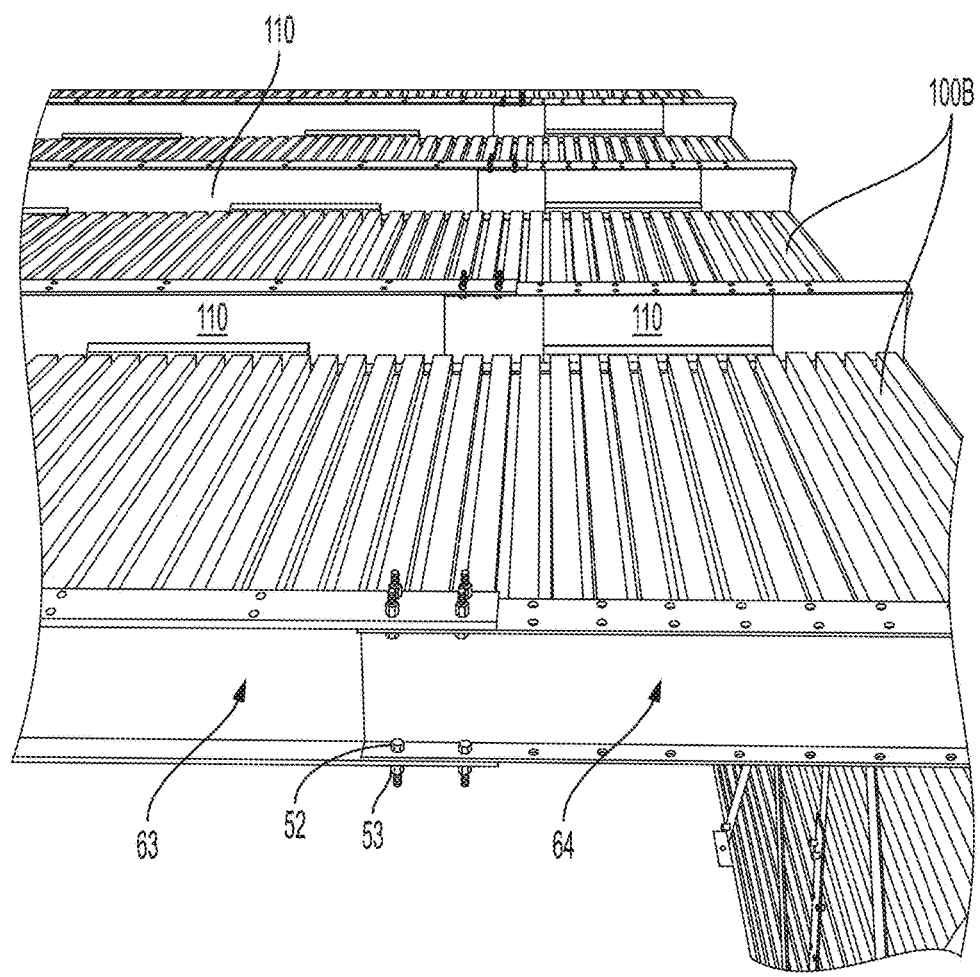
FIG. 28 depicts a perspective view of a portion of the overcast system of FIG. 1, showing an upper portion thereof.

The outer beam sections comprise first and second bifurcated beam sections (62, 64). First and second bifurcated outer beam sections (62, 64) are identically configured and, as best seen in FIGS. 28 and 29, each bifurcated beam section (62, 64) comprises a pair of elongate channel members (70, 71) secured with respect to one another in spaced-apart relationship such that a slot is provided between their respective webs along a majority of their lengths. Similar to the support columns (22), the web (67) of central beam section (63) is slidably received within this slot, while the channel members (70, 71) are each slidably received between the upper and lower flanges (65, 66) of the central beam section (63) on opposite sides of the web (67) of the central beam section (63).

Each channel member (70, 71) generally comprises a structural channel, or C-beam, and has an upper flange (72, 73) and an lower flange (74, 75), with the inner and outer flanges extending away from one side of a web (76, 77). Thus, as seen in the end view of FIG. 26, channel members (70, 71) have a C-shaped cross-section.

Channel members (70, 71) are maintained adjacent one another such that their respective webs (76, 77) are in a facing relationship with a slot (78) provided between the webs (76, 77) along nearly the entire length of the bifurcated beam sections (62, 64). The channel members (70, 71) can be secured with respect to one another and maintained in this spaced apart relationship in a variety of ways, such as affixing (e.g., by welding) one or more spacer plates between the webs (76, 77) of the channel members (70, 71) at or adjacent their outer ends.

In the embodiment shown, a spacer plate (79) is welded in place between webs (76, 77) of the channel members (70, 71) adjacent the outermost ends of the channel members (70, 71) such that slot (78) is provided between the webs (76, 77), the slot (78) having a width equal to the thickness of the spacer plate (79). In addition, a triangular end cap (80) is welded to the outmost endwalls of channel members (70, 71), flush with the upper surface of the upper flanges (72, 73).

Figure 25:
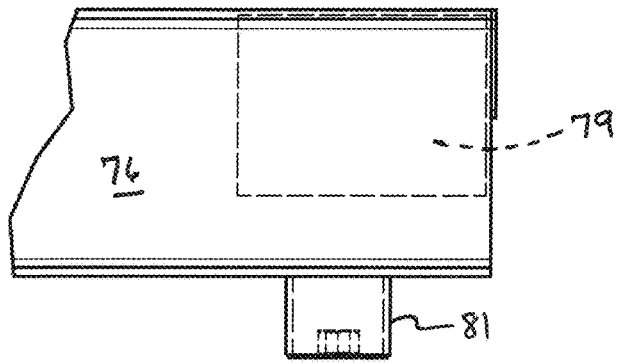
FIG. 25 depicts a side view of an end region of an outer beam section.

In addition, a mounting leg (81) is welded to the bottom surface of lower flanges (74, 75) adjacent the outer ends of the lower flanges, as shown, extending downwardly from the bottom surfaces of the lower flanges (74, 75). In the exemplary embodiment shown, mounting leg (81) comprises a cylindrical cup support beam leg receiver (42) comprises a cylindrical cup having an apertured bottom wall (82), with a centrally located aperture in the bottom wall (82). The aperture may be threaded so as to threadingly receive the threaded bolt (48) of the mounting beam leg receiver (42) on the upper end of a support column (22). Alternatively, in the embodiment shown in FIGS. 25-27, a threaded nut (83) is welded to the bottom wall (82), aligned with the central aperture in the bottom wall (82). Thus, threaded bolt (48) of the mounting beam leg receiver (42) may be threadably secured to the mounting leg by threading the bolt (48) into the nut (83), as further described herein. As also further described herein, mounting leg (81) had an outer diameter slightly less than the inner diameter of support beam leg receiver (42) such that mounting leg (81) may rotate within support beam leg receiver (42) for diagonal adjustment of the frame (20).

First and second bifurcated beam sections (62, 64) further include a plurality of apertures in their upper and lower flanges (72, 73, 74, 75) for variably securing the bifurcated beam sections (62, 64) to the central beam section (63) at opposite ends thereof. A row of horizontally aligned apertures (84, 85) is provided on each of upper flanges (72, 73), with the plurality of apertures in each row equally spaced from one another by a distance J along the length of the upper flanges (72, 73) and extending through the thickness of the upper flanges. The two rows of apertures (84, 85) are also aligned with one another such that pairs of laterally aligned apertures (84, 85) are provided along the length of the bifurcated beam section (62, 64), with an aperture of each laterally aligned pair located on either side of slot (78), as best seen in FIG. 29. The two rows of apertures (84, 85) are similarly spaced laterally from either side of the web (76, 77) of the channel members (70, 71), as best seen in FIG. 29. A second row of horizontally aligned apertures (86, 87) is provided on each of lower flanges (74, 75), with the plurality of apertures in each row equally spaced from one another by a distance J along the length of the lower flanges (74, 75) and extending through the thickness of the lower flanges. The second row of apertures (86, 87) is arranged and configured similar to the first row of apertures (84, 85).

The width of the slot (78) provided between the webs (76, 77) of the channel members (70, 71) is slightly greater than the thickness of the web (67) of the central beam section (63) such that the web (67) may be slidably received within the slot (78) with minimal play. For example, the width of slot (78) in some embodiments is no more than ⅛" greater than the thickness of the web (67), no more than ¹⁄₁₆" greater, or no more than ¹⁄₃₂" greater. In the particular embodiment shown, central beam section (63) comprises a conventional steel W 8×15 wide flange I-beam. Thus, the thickness of web (67) is 0.245", and the width of the slot (78) is approximately ¼".

The outer width of each of the channel members (70, 71) (measured similar to G in FIG. 18) is slightly less than the interior depth of the central beam section (63) (measured similar to H in FIG. 6A) (i.e., the width of the channel formed by the opposing flanges and the web). Thus, as web (67) of central beam section (63) is slidably received within the slot (78) of a bifurcated beam section (62, 64), portions of the channel members (70, 71) are slidably received between the flanges (65, 66) of the central beam section (63), on opposite sides of the web (67). For example, the outer width of each of the channel members (70, 71) in some embodiments is no more than ¼" less than the interior depth of the central beam section (63), or no more than ⅛" less. In the particular embodiment shown, since lower post (24)

comprises a conventional steel W 8×15 wide flange I-beam, the interior depth of the central beam section (63) is 7.48", and the outer width of each of the channel members (36A, 36B) is approximately 7⅜" (7.375").

Figure 26:
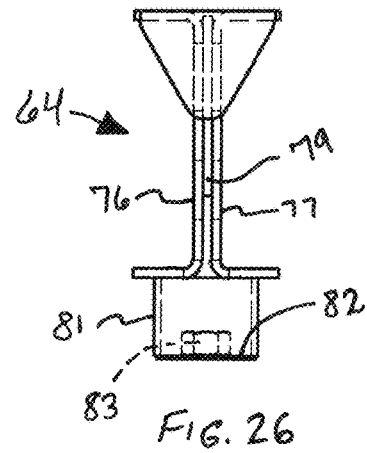
FIG. 26 depicts an end plan view of the outer beam section of FIG. 25.
Figure 27:
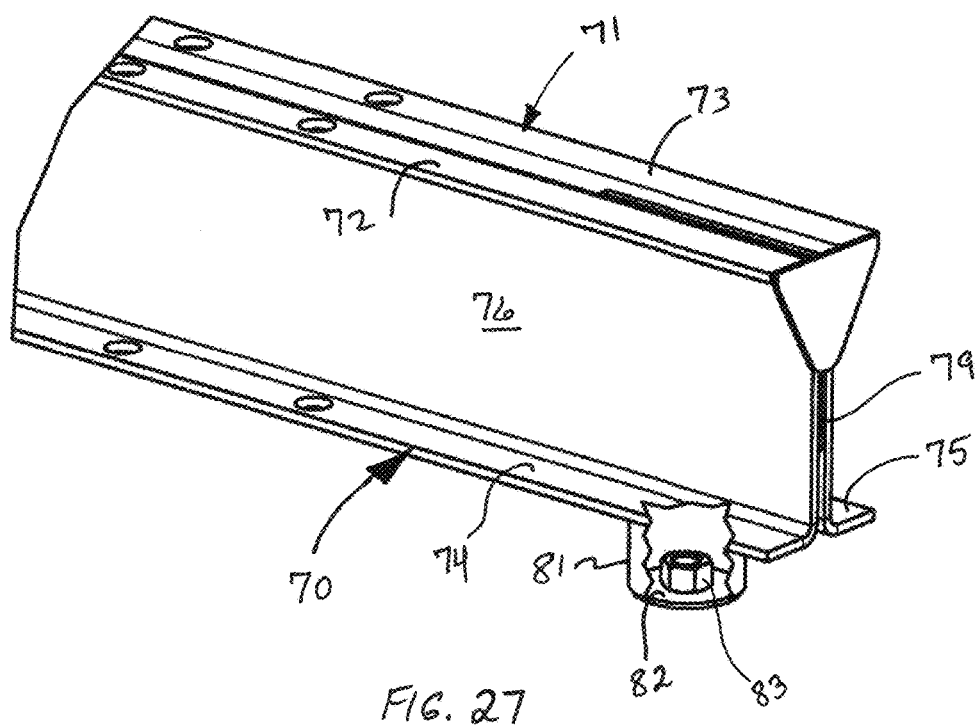
FIG. 27 depicts a perspective view of a portion of the outer beam section of FIG. 25.

As best seen in the end view of FIG. 26, bifurcated beam sections (62, 64) comprising elongate channel members (70, 71) secured with respect to one another in spaced-apart relationship has an I-shape cross-section approximating that of an I-beam. In other words, bifurcated beam sections (62, 64) essentially comprise I-beams, each having a pair of webs (76, 77) in facing, spaced-apart relationship. This I-beam configuration has a total flange width (measured similar to (F) in FIG. 6C) which is merely the sum of the width of the flanges on each channel member (70, 71) plus the width of the slot (78) between the webs (76, 77). In the embodiment shown, the total flange width is approximately equal to the width of the flanges of central beam section (63), as best seen in FIG. 32. In other embodiments, however, the total flange width of the bifurcated beam sections (62, 64) is greater than the width of the flanges of central beam section (63), while in still further embodiments the total flange width is less than the width of the flanges of central beam section (63).

In order to assemble each support beam (60), one end of central beam section (63) is aligned with first bifurcated beam section (62) and the other end of central beam section (63) is aligned with second bifurcated beam section (64), as seen in FIGS. 29 and 31. As best seen in FIG. 31, the interior end of first bifurcated beam section (62) is slid onto the left end (88) of central beam section (63) such that web (67) is received within the slot (78) and the inner end portions of the channel members (70, 71) are received between the flanges (65, 66) of the central beam section (63) on opposite sides of the web (67). The apertures on the flanges of the first bifurcated beam section (62) and the central beam section (63) are configured to align with one another as the first bifurcated beam section (62) is slid into the central beam section (63) at various support beam lengths. In this manner, and as best seen in FIG. 32, the apertures (69A, 69B) on upper flange (65) of central beam section (63) are alignable with the apertures (84, 85) on upper flanges (72, 73) of channel members (70, 71). At the same time, the apertures (68A, 68B) on lower flange (66) of central beam section (63) are alignable with the apertures (86, 87) on lower flanges (74, 75) of channel members (70, 71).

With the apertures aligned in the manner shown in FIG. 32, fasteners such as threaded bolts (52) are inserted through aligned apertures and secured in place using a threaded nut (53) (see FIGS. 19 and 28). It will be understood that other types of fasteners may be used for this purpose such as rivets, and the like. In the case of threaded bolts (52), in the embodiment shown the head of the bolt (52) is positioned on the interior side of the channel member (70, 71) and the nut (53) is threaded onto the bolt (52) on the outside of central beam section (63) and tightened against the upper and lower flanges (65, 66) of the central beam section (63) in order to secure the central beam section (63) to the first bifurcated beam section (62) at the desired length. This process is then repeated at the other end of the support beam (60) with the interior end of second bifurcated beam section (64) slid onto the right end (89) of central beam section (63) (as seen in FIG. 30).

As seen in FIGS. 19 and 28, in the exemplary embodiment shown four threaded bolts (52) are used to secure each end of the central beam section (63) to a bifurcated beam section (62, 64). However, depending on the length of the support beam (60), there may be additional pairs of aligned apertures on the flanges, thus allowing for the use of additional threaded bolts, as desired.

Figure 33:
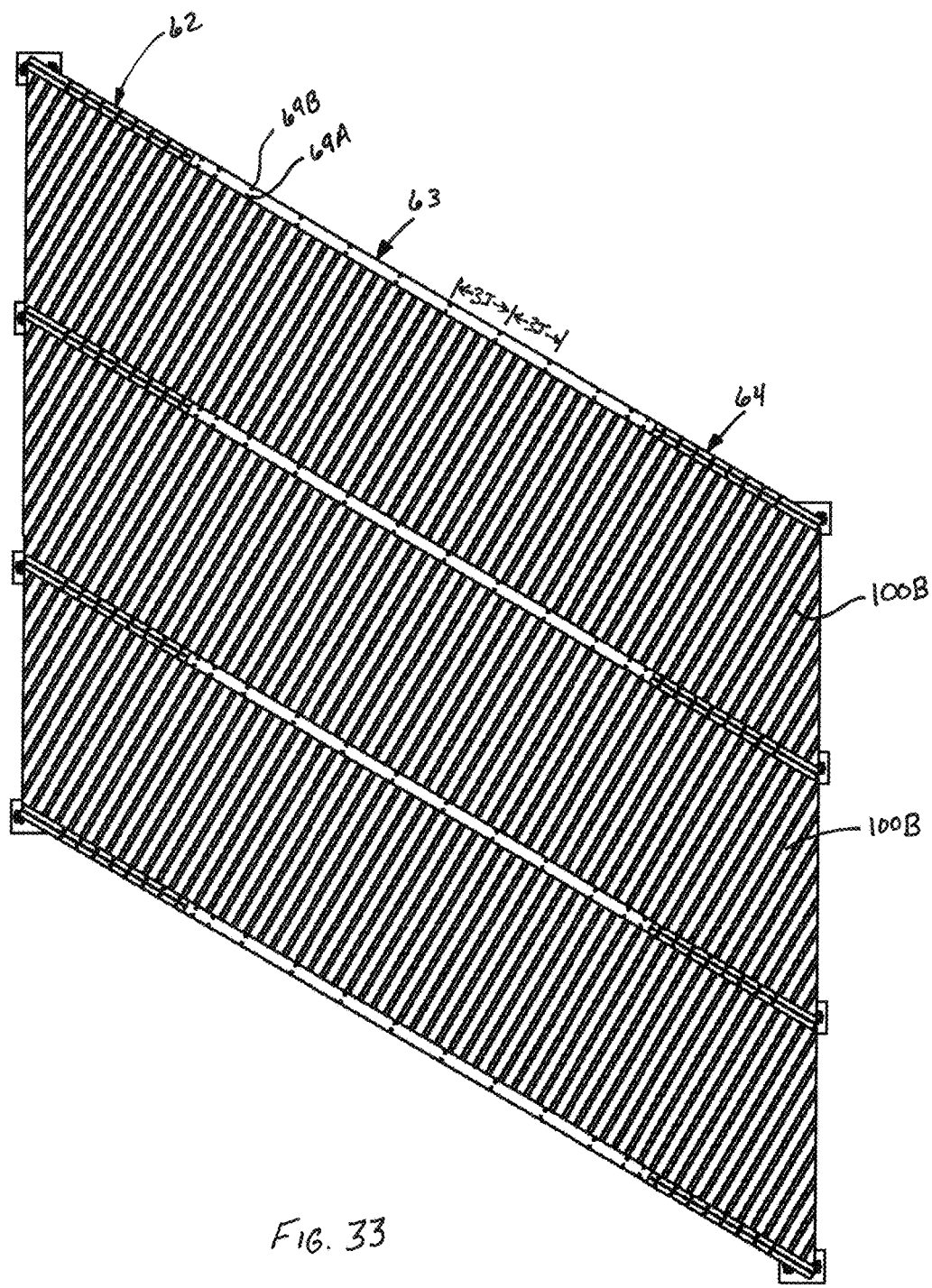
FIG. 33 depicts a top plan view of the overcast system of FIG. 1, wherein the overcast system has been diagonally adjusted.

In the particular embodiment shown in the figures, the upper flange (65) of central beam section (63) includes two rows of apertures (69A, 69B), each row having a total of twelve apertures with each aperture of a row laterally aligned with an aperture of the other row (see FIG. 33). Also in the particular embodiment shown in the figures, each flange (72, 73, 74, 75) of the channel members (70, 71) of the bifurcated beam sections (62, 64) includes a total of ten equally spaced apertures (68A, 68B), with the apertures in the upper flange (72, 73) vertically aligned with an aperture in the lower flange (74, 75) of the channel member (70, 71). As best seen in FIG. 22, however, the apertures (68A, 68B) are not evenly spaced along the entire length of the channel member (70, 71), as no apertures are located in the outermost end regions of each flange (72, 73, 74, 75). In the particular embodiment shown, apertures in the outermost end regions are not needed since the extent to which the central beam section (63) can be inserted into the slot (78) of a bifurcated beam section (62, 64) is limited by, among other things, the spacer plate (79). Of course it will be understood that the number and arrangement of the various apertures shown in the figures is merely exemplary of one possible configuration and the present invention is not so limited.

The support beams (60) are thus constructed in a manner which allows for the adjustment of beam length while also providing an I-beam cross-sectional shape throughout the entire length of the support beam (60). In other words, adjustability is provided without significantly sacrificing strength or rigidity. It will also be understood that the arrangement of the beam sections (62, 63, 64) of the support beams (60) can be modified such that the central beam section is bifurcated, comprising a pair of channel members secured in a spaced-apart relationship (e.g., using a centrally located spacer plate), and the outer beam sections have an I-beam configuration such that the web of these I-beams are slid into the slot provided between the channel members of central beam section.

In still further alternative embodiments, support beams (60) may be constructed from a single bifurcated beam section (62) and a central beam section (63). In such an embodiment, a mounting leg (81) is attached (e.g., welded) to the bottom surface of lower flange (66), adjacent one end of the beam section (63) (at the end opposite the end slidably received by the bifurcated beam section (62)).

Figure 34:
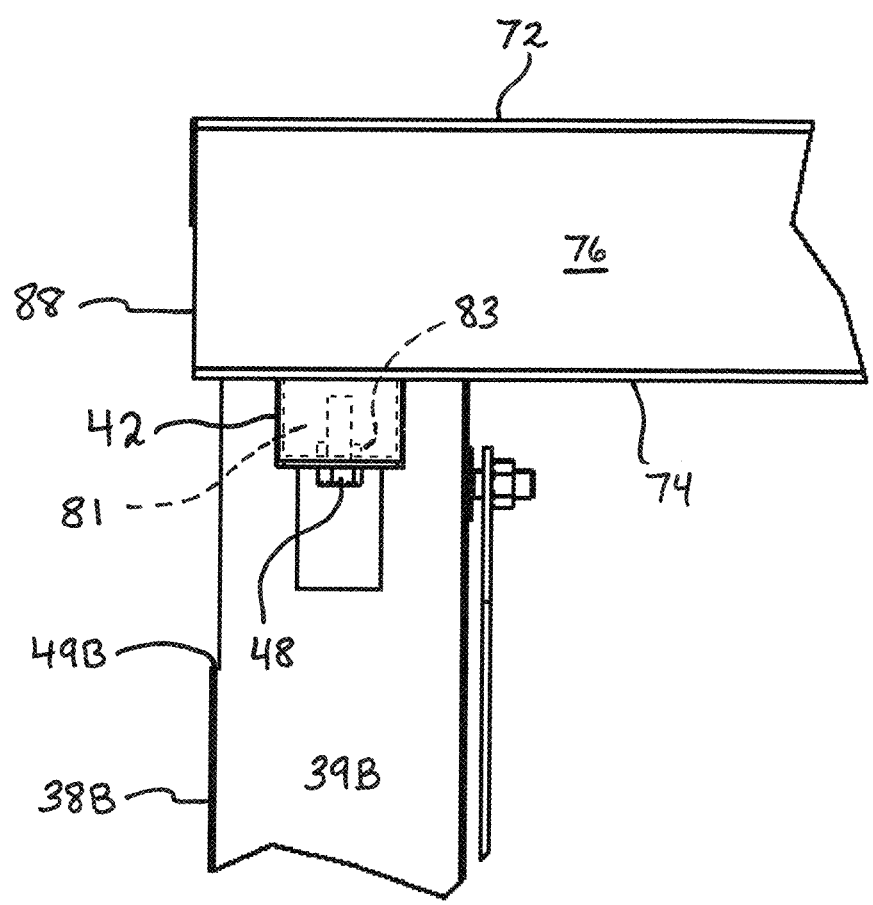
FIG. 34 depicts a side view of a corner of the frame of FIG. 4.

Once the support beams (60) have been assembled on site (i.e., at the mine intersection or other location), each support beam (60) is mounted to a pair of previously assembled support columns (22) such that the support beam (60) spans the distance between the support columns (22). As best seen in FIG. 34, each mounting leg (81) at an end of a support beam (60) is inserted into the beam leg receiver (42) at the upper end of a support column (22). The mounting leg (81) is then rotated within the beam leg receiver (42) in order to properly align the support beam (60) with respect to the support column (22). For example, during the initial assembly of the frame (20), and when a square installation (FIG. 2) is desired, the mounting leg (81) is rotated within the beam leg receiver (42) until the support beam (60) is orthogonal to the support column (22), with the plane of web (76, 77) of the channel member (70, 71) substantially parallel to the plane of web (39A, 39B) of the channel member (36A, 36B). This process is repeated at the other end of the support beam (60) with a second support column (22). Threaded bolts (48) are then inserted through the apertures (47) in the bottom walls (46) of the mounting leg receivers (42) of the support columns and through the apertures in the bottom walls (82) of the mounting legs (81), threadably engaging nuts (83) in the interior of mounting legs (81). The bolts (48) are then tightened so as to secure each end of the support beam (60) to an upper end of a support column (22), as shown. The support beam (60) is thus supported at the upper ends of the bifurcated upper posts (26) of the support columns (22).

The above-described process is repeated for each of the support columns (60) necessary to provide the desired length of the overcast system (10). Next, adjacent support beams (60) as well as adjacent support columns (22) on either side of the frame (20) are optionally secured to one another using securement members extending between and affixed to adjacent support columns and/or adjacent support beams.

Figure 37:
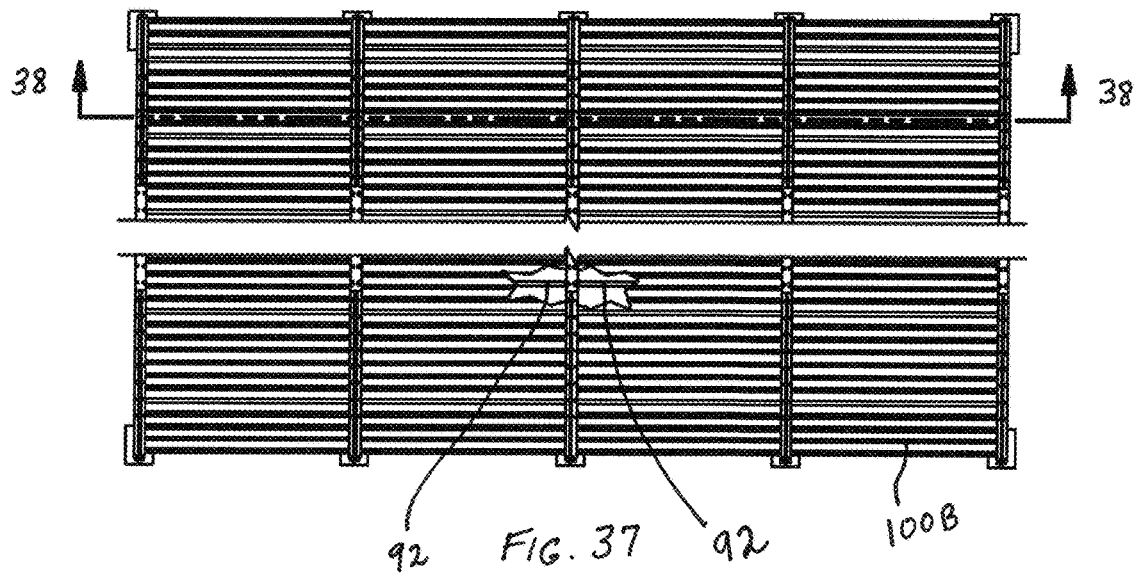
FIG. 37 depicts a partially broken top view of the overcast system of FIG. 1.
Figure 40:
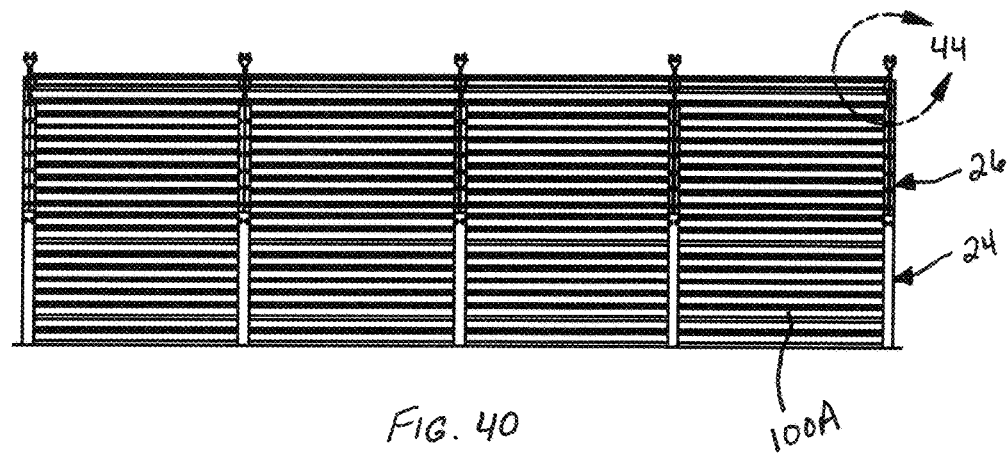
FIG. 40 depicts an outer side view of the overcast system of FIG. 1.

As shown in FIG. 35, alignment bars (92) comprise elongate members (e.g., steel plate) having an aperture (93) at each end thereof. Apertures (93) in the depicted embodiment are elliptical in order to facilitate attachment to the frame (20) (e.g., to account for a modest amount of unevenness in the various distances between adjacent columns and beams). As best seen in FIG. 4 and the top, partially cut-away view of FIG. 37, alignment bars (92) are mounted to the lower flanges (66) of the central beam sections (63) using the same apertures (68, 84, 85, 86, 87) and threaded bolts (52) used to secure the central beam section to the bifurcated beam sections (62, 64). An alignment bar (92) extends between each pair of adjacent support beams (60), and at each location where the central beam section (63) is secured to a bifurcated beam section (62, 64). While FIG. 4 depicts two alignment bars (92) secured to and extending between each pair of adjacent support beams (60), it will be understood that additional alignment bars (92) may be secured to the lower flanges of the central beam section (63) and/or bifurcated beam sections (62, 64), and additional apertures may be provided in the lower flange (66) of the central beam section (63) for this purpose.

Figure 39:
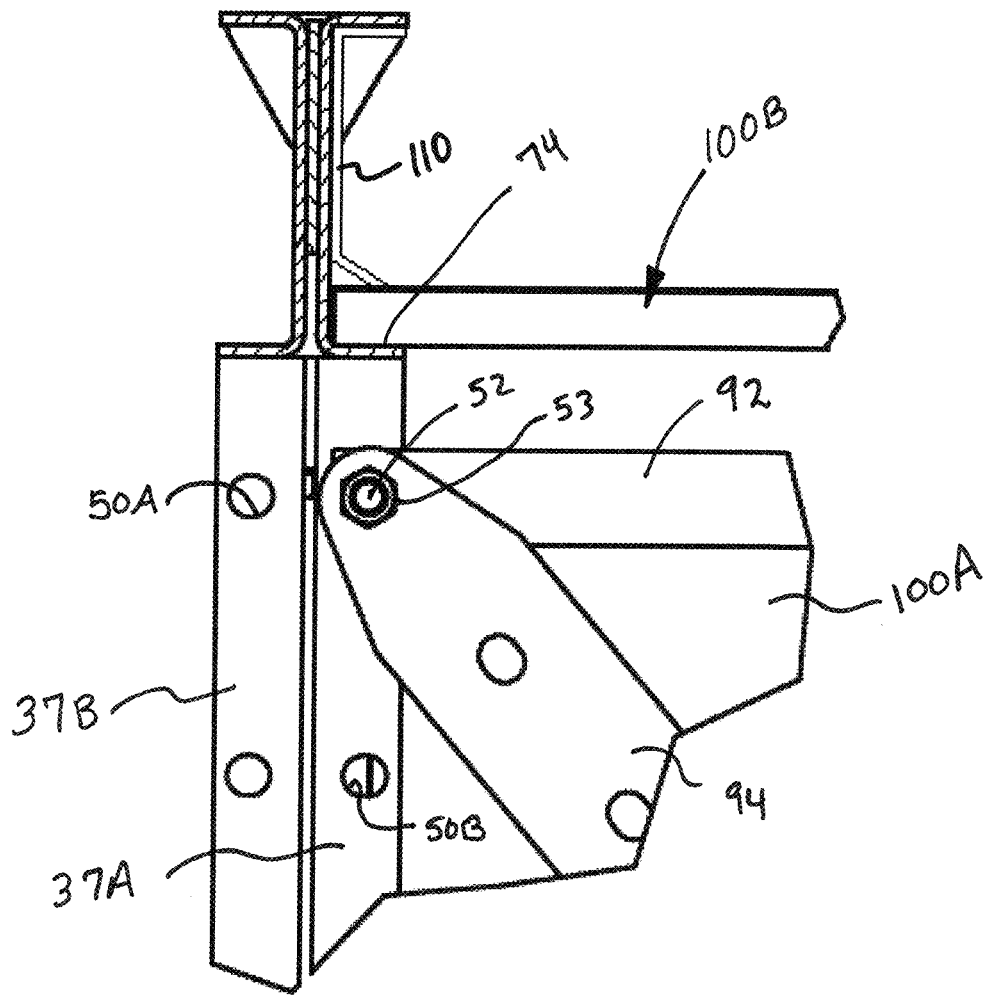
FIG. 39 depicts an enlarged view of a corner portion of the overcast system of FIG. 38.

Similarly, as best seen in FIG. 4 and the interior side views of FIGS. 38 and 39, alignment bars (92) are also mounted between adjacent pairs of support columns (22), at the upper and lower ends thereof. Alignment bars (92) are affixed to the inner flanges (37A, 37B) of the bifurcated upper posts (26) of adjacent support columns (22) at the highest aperture (50A, 50B) therein. Similarly, alignment bars (92) are affixed to the inner flanges (27) of the lower posts (24) of adjacent support columns (22) at the lowest aperture (34A, 34B) therein. Once again the alignment bars (92) are affixed between adjacent support posts (22) using threaded bolts and nuts, as shown in FIG. 39. While FIG. 4 depicts two alignment bars (92) secured to and extending between each pair of adjacent support columns (22), it will be understood that additional alignment bars (92) may be secured to the inner flanges of the lower and upper posts (24, 26), using the existing apertures shown or using additional apertures provided in the inner flanges for this purpose.

As shown in FIG. 36, cross-braces (94) comprise elongate members (e.g., steel plate) having a first aperture (95) at one end thereof and a plurality of spaced-apart second apertures (96) extending from the opposite end thereof. Second apertures (96) in the depicted embodiment are elliptical in order to facilitate attachment to the frame (20). If desired, first aperture (95) may also be provided in an elliptical shape. Cross-braces (94) also have tapered ends to further facilitate attachment.

As best seen in FIGS. 4 and 38, cross-braces (94) are mounted between adjacent pairs of support columns (22), to the upper and lower ends thereof. However, unlike alignment bars (92), cross-braces (94) extend diagonally between adjacent support posts (22). Thus, as seen in FIG. 38, one end of a cross-brace (94) is affixed to an inner flange (37A, 37B) of a bifurcated upper post (26) of a support column (22) at the highest aperture (50A, 50B) therein, and the other end of the cross-brace (94) is affixed to the inner flange (27) of the lower post (24) of the adjacent support column (22) at the lowest aperture (34A, 34B) therein. In the embodiment shown, the first aperture (95) in the cross-brace (94) is used to attach an end of the cross-brace to an inner flange (27) of a lower post (24), and one of the second apertures (96) is used to attach the other end of the cross-brace to the inner flange (37A, 37B) of the bifurcated upper post (26) of the adjacent support column (22). The second aperture (96) used for this purpose is selected based on the final desired height of the overcast. Once again the cross-braces (94) are affixed between adjacent support posts (22) using threaded bolts and nuts, as shown in FIG. 39, using, for example, the same apertures used to secure the alignment bars (92) between adjacent support posts (22). Unused portions of the cross-braces (i.e., when the frame is less than maximum height) may be cut off, as desired or necessary.

In addition to securing the initial assembly of frame (20) prior to adding the side and ceiling panels, alignment bars (92) and cross-braces (94) are also used to bring the structure into proper alignment (i.e., to square or true the structure) prior to making any vertical, horizontal and/or diagonal adjustments to the frame before attaching the side and ceiling panels (e.g., by using the alignment bars and/or cross-braces to pull columns away from each other).

The support columns and support beams can be adjusted in height and length prior to erecting the frame (20). Once the frame (20) has been erected at the mine intersection or other desired location, and the alignment bars (92) and cross-braces (94) attached thereto, the frame (20) can be further adjusted vertically, horizontally and/or diagonally to conform to the desired height, width and/or orientation. Vertical adjustment is accomplished by removing the fasteners (e.g., threaded bolts (52)) affixing the lower and upper posts (24, 26) of each support column (22) to one another, adjusting the upper post downward to the desired height, and replacing the fasteners in the aligned apertures. Supplemental supports such as roof hung supports, jacks and the like can be used to support the beams during any necessary height adjustment after initial assembly of the frame. Horizontal adjustment is performed in a similar manner—by removing the fasteners maintaining the support beams (60) at a first length, adjusting the bifurcated beam sections (62, 64) inward to the desired length, and then replacing the fasteners in the aligned apertures. Finally, diagonal adjustment is accomplished by loosening the fasteners (e.g., threaded bolts (48)) that rotationally secure each mounting leg (81) within a beam leg receiver (42), pivoting the frame (20) to the desired angle (e.g., FIG. 33), and then replacing the fasteners so as to rotationally secure each mounting leg (81) within the corresponding beam leg receiver (42).

FIG. 19A depicts frame (20) in its fully extended (maximum height and maximum width) orientation. FIG. 19B, on the other hand, depicts frame (20) in its fully retracted (minimum height and minimum width) orientation. In one embodiment, the frame (20) is adjustable between a height of 4.5 and 8 feet, in 6 inch increments (wherein the height is the clearance beneath the lower flanges of the support beams), and is horizontally adjustable between an outside width of 16 and 24 feet, in 6 inch increments.

Once the frame (20) has been assembled and adjusted to the necessary size and angular orientation within the mine intersection or other location, side and ceiling panels are attached to the frame (20). Any of a variety of panel configurations and materials can be used, including the side and ceiling panels, as well as attachment mechanisms for the same, described in the '476 App.

In the exemplary embodiment depicted in the figures herein, the side and ceiling panels comprise steel composite decking panels (100) shown in FIGS. 41-43. Decking panels (100) have a plurality of ribs (104), with a second plurality of ribs (106) within the first ribs (104), as shown. The panels are generally installed on the frame (20) such that the outer surface (102) is exposed. In this manner, the underside of the first set of ribs (104) is exposed for applying a cementitious sealing composition over the composite decking panels (100).

As mentioned previously, the side and ceiling panels (100A, 100B) may all have the same length (M) which is slightly less than the distance (D) (see FIG. 4) between adjacent support columns (22) and support beams (60). The width of the side and ceiling panels (100A, 100B) may also be the same, or may vary in order to facilitate installation. During assembly, it will generally be necessary to cut the width of some of the side and ceiling panels (100A, 100B) in order to cover the entirety of the sides and ceiling of the overcast system (10), particularly without any overlap of adjacent side and ceiling panels (100A, 100B). Ceiling panels (100B) comprising decking panels (100) are cut to the necessary width and are then slid between adjacent support beams (60). The length (M) of the ceiling panels (100B) is such that the ceiling panels will rest upon, and be supported by the lower flanges (66, 74, 75) of the bifurcated and central beam sections (62, 63, 64) (see, e.g., FIG. 39).

Figure 45:
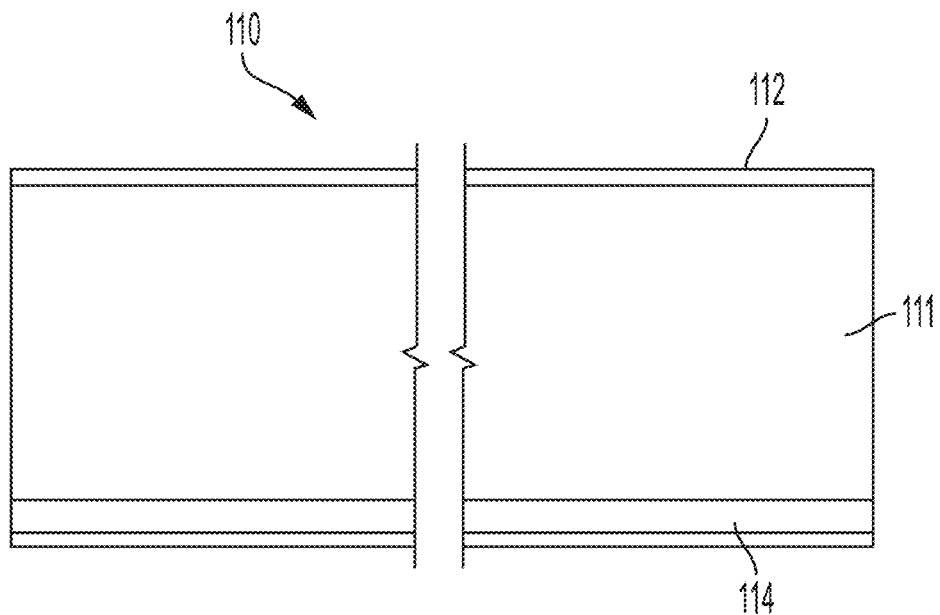
FIG. 45 depicts a top plan view of a panel retention clip used in the overcast system of FIG. 1.
Figure 46:
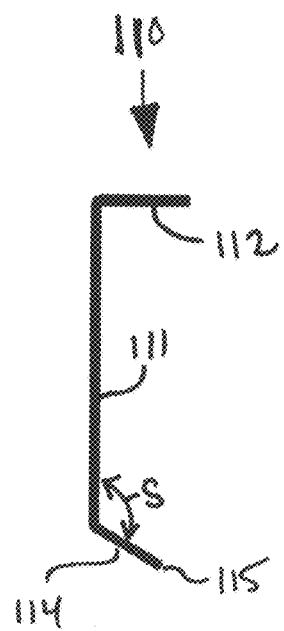
FIG. 46 depicts an end plan view of a panel retention clip of FIG. 45.

The ceiling panels can be held in place in a variety of ways such as by using various types of fasteners, adhesives, sealants or in other ways known in the art. In the embodiment shown in the figures, panel retention clips (110) depicted in FIGS. 45 and 46. Panel retention clips (110) comprise a rectangular panel (111) having an upper flange (112) extending away from one side of the rectangular panel (111) at a right angle thereto, and an angled lower flange (114) which extends away from the rectangular panel (111) at an included angle S that is more than 90 degrees and less than 180 degrees (e.g., between about 100 and about 140 degrees, or about 120 degrees). Because of the angle of lower flange (114) with respect to the rectangular panel (111) as well as the thickness of the material used to fabricate the retention clip (110), clip (110) is able to flex at lower flange (114) such that the lower flange (114) may be used to apply a clamping force against the ceiling and side panels.

As best seen in FIG. 39, retention clip (110) is inserted within the channel of a bifurcated beam section (62, 64) and/or a central beam section (63), directly above a ceiling panel (100B). The upper flange (112) is in facing relationship with the underside of an upper flange (65, 72, 73) while the rectangular portion (111) of the clip (110) rests against the web (67, 76, 77). When positioned in this manner, the distal end (115) of lower flange (114) is urged against the upper surface of ceiling panel (100B), thus urging the ceiling panel (100B) against the lower flange (66, 74, 75) on which the ceiling panel (100B) rests. As a result, the ceiling panel (100B) is retained in position.

Side panels (100A) are attached to the sides of the frame (20) in a similar fashion. Thus, side panels (100A) compris-ing decking panels (100) are cut to the necessary width and are then slid between adjacent support columns (22). The length (M) of the side panels (100A) is such that the side panels held against the inner flanges (27, 37A, 37B) of the lower and upper posts (24, 26) (see, e.g., FIG. 44).

The side panels (100A) can be held in place in a variety of ways such as by using various types of fasteners, adhesives, sealants or in other ways known in the art. In the embodiment shown in the figures, the same panel retention clips (110) used for holding the ceiling panels (100B) in place are used to retain the side panels in place. As best seen in FIG. 59, retention clip (110) is inserted within the channel of a bifurcated upper post (26) and/or a lower post (24), directly adjacent a side panel (100A). The upper flange (112) is in facing relationship with the inner surface of an outer flange (28, 38A, 38B) while the rectangular portion (111) of the clip (110) rests against the web (29, 39A, 39B). When positioned in this manner, the distal end (115) of lower flange (114) is urged against the outer surface of side panel (100A), thus urging the side panel (100A) against the inner flange (27, 37A, 37B) against which the side panel (100A) is positioned. As a result, the side panel (100A) is retained in position.

The retention clips (110) can be provided in a variety of lengths for accommodating various configurations of overcast (10). In addition, a single retention clip (110) may be used on each end of a side or ceiling panel (100A, 100B), or a plurality of retention clips (110) may be used. Similarly, a single retention clip (110) may even be sufficiently long so as to be capable of retaining more than one side or ceiling panel in place.

Figure 44:
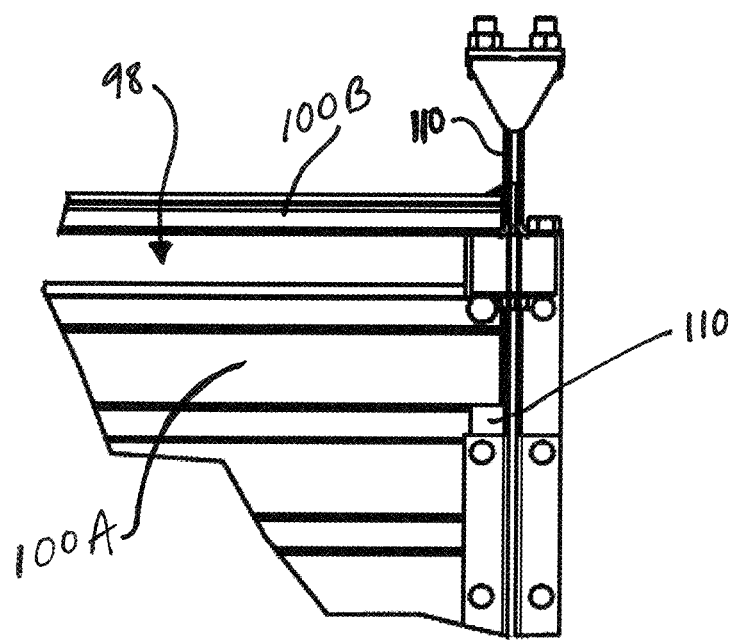
FIG. 44 depicts an enlarged view of a portion of the overcast system of FIG. 40.

In some installations, air gaps such as gap (98) shown in FIG. 44 are not problematic, while in other, typically high pressure, installations, such air gaps should be avoided. In order to do so, either the side panels (100A) are widened and slid upward to cover the air gap (98), or additional sheeting or other covering material (e.g., steel sheet, shotboard, etc.) is applied over such air gaps.

Wherein additional sealing and/or strength is desired, a cementitious sealing composition is applied to the overcast system (10). As further described in the '476 App., the sealing composition is applied to the exterior surfaces of the overcast, as well as along the interior of the overcast (i.e., the tunnel) along the base of the overcast. However, the cementitious sealing composition may also, or alternatively, be applied to the entire interior of the overcast. As used herein, a cementitious composition refers to any hydraulically hardenable, cement-based composition comprising cement, water, one or more inert components (e.g., sand and/or other aggregates) and, optionally, one or more adjuvants.

In one embodiment, the cementitious sealing composition comprises: cement, particularly Portland cement (e.g., in conformance with ASTM C150); one or more supplementary cementitious materials, particularly microsilica (also referred to as silica fume) (particularly in conformance with ASTM C1240); sand (e.g., concrete sand, particularly in conformance with ASTM C33); reinforcing fibers; and water. The supplementary cementitious material is used to replace a portion of the cement which would otherwise be necessary, and provides improved performance. Suitable reinforcing fibers include various polymer fibers such as polypropylene or metal fibers (e.g., steel).

One specific embodiment of a cementitious sealing composition comprises, by weight (dry components, without water):

22.5% Portland Cement, Type I/II (ASTM C150)
74.95% Concrete Sand (ASTM C33)

2.5% Microsilica (ASTM C1240)
0.05% Polypropylene fibers

The above composition is prepared so as to provide, when hardened, a flexural strength of at least 1,000 psi (28-day flexural strength, ASTM C78), and a 28 day compressive strength of at least 8,000 psi (ASTM C109).

The cementitious sealing composition is applied to the overcast structure by hand (i.e., like conventional concrete or mortar), or as a gunite or shotcrete spray. While the sealing composition, particularly when reinforced with fibers, will stick to the overcast without further modification, the overcast system can be further modified to facilitate adherence of the cementitious sealing composition, as further described in the '476 App.

In order to further facilitate sealing between the overcast system and the ribs and roof of the mine passageways, some embodiments of the metal frame include a sealing flange extending about portions of the frame adjacent the openings to the tunnel T, as also described in the '476 App. The sealing flange increases the dimensions of the overcast at at least one of the tunnel entrances, in at least one direction (e.g., the height, width, and/or length).

The mine ventilation structures described herein may also be provided with various additional features, such as described in the '476 App., including, for example, stair assemblies attached on either (or both) side of the overcast system, one or more sliding regulator doors mounted on one or both sides of the frame, one or more hinged doors, ramp assemblies side of the overcast system, an airlock assembly (e.g., located beneath a ramp assembly) and/or a man hole assembly that replaces portions of one or more side panels.

The present disclosure also encompasses a kit for the mine ventilation systems described herein, including the various components previously described herein. For example, some embodiments of such kits include a plurality of support columns (e.g., a plurality of pairs of support columns), a plurality of support beams, and optionally a plurality of securement members (e.g., alignment bars and/or cross-braces). Some embodiments of such kits further include a plurality of ceiling panels and/or a plurality of side panels. Still further embodiments of the kits include fasteners (e.g., threaded bolts and nuts) for assembling the mine ventilation structure.

While several devices and components thereof have been discussed in detail above, it should be understood that the components, features, configurations, and methods of using the devices discussed are not limited to the contexts provided above. In particular, components, features, configurations, and methods of use described in the context of one of the devices may be incorporated into any of the other devices. Furthermore, not limited to the further description provided below, additional and alternative suitable components, features, configurations, and methods of using the devices, as well as various ways in which the teachings herein may be combined and interchanged, will be apparent to those of ordinary skill in the art in view of the teachings herein.

Having shown and described various versions in the present disclosure, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, versions, geometries, materials, dimensions, ratios, steps, and the like discussed above are illustrative and are not required.

By way of further example, in some alternative embodiments only the support beams are adjustable (in length), while the support columns are of a fixed height (e.g., as shown and described in the '476 App.). In these embodiments, the support beams can be either adjustably mounted to opposing support columns (to allow for alignment and diagonal adjustment), or non-adjustably mounted to the support columns (e.g., as shown and described in the '476 App.).

In further alternative embodiments, only the support columns are adjustable (in height), while the support beams are of a fixed length (e.g., as shown and described in the '476 App.). Once again, in these alternative embodiments, the support beams can be either adjustably mounted to opposing support columns (to allow for alignment and diagonal adjustment), or non-adjustably mounted to the support columns (e.g., as shown and described in the '476 App.).

Accordingly, the scope of the present invention should be considered in terms of the following claims and is understood not to be limited to the details of structure and operation shown and described in the specification and drawings.

What is claimed is:

1. An adjustable frame for a mine ventilation structure, said frame having a width, a height and a length, comprising:
   (a) two or more pairs of adjustable height support columns; and
   (b) a plurality of adjustable length support beams, each adjustable length support beam rotatably mounted to and spanning between a pair of said support columns, such that the support beam is adjustable rotatably with respect to the support columns to which it is mounted, thereby allowing the angle of the support beam with respect to the length of the frame to be adjusted by rotation of the support beam with respect to the support columns;
   wherein the frame is adjustable vertically and laterally, and
   further wherein each of said adjustable height support columns comprises a first post having a web extending at least a portion of its length, and a second bifurcated post having a slot extending a portion of its length, wherein a portion of said web of the first post is slidably received and adjustably secured within said slot of the second bifurcated post.

2. The adjustable frame of claim 1, wherein said adjustable height support columns and said adjustable length support beams have I-beam cross-sectional shapes.

3. A method of constructing an overcast in an intersection within a mine, comprising:
   (a) assembling the frame of claim 1 within a mine intersection;
   (b) adjusting the height and width of the assembled frame; and
   (c) mounting a plurality of side panels and ceiling panels to the frame such that a tunnel is provided beneath the ceiling panels, bounded on either side by the side panels.

4. The adjustable frame of claim 1, wherein said bifurcated second post comprises a pair of elongate channel members secured with respect to one another in spaced-apart relationship such that said slot is provided between said channel members.

5. The adjustable frame of claim 4, wherein each of said channel members of the second post has a web and a pair of flanges extending away from one side of the web, said channel members secured with respect to one another such that their respective webs are in a facing relationship, with said slot provided between the webs of the channel members.

6. The adjustable frame of claim 5, wherein said first post comprises an I-beam having a pair of flanges extending away from both sides of the web of the first post, wherein when a portion of the web of the first post is slidably received within the slot of the bifurcated second post, portions of said channel members of the second post are slidably received between the flanges of the first post, on opposite sides of the web of the first post.

7. The adjustable frame of claim 1, wherein each of said first and second posts include a plurality of apertures, the apertures of the first post alignable with apertures of the second post at a plurality of column heights for receiving fasteners through the aligned apertures in order to secure the column at one of said plurality of column heights.

8. The adjustable frame of claim 1, wherein each of said adjustable length support beams comprises an I-beam section having upper and lower flanges joined by a web, and at least one bifurcated beam section having a slot extending a portion of its length, wherein a portion of the web of the I-beam section is slidably received and adjustably secured within said slot of said at least one bifurcated beam section.

9. The adjustable frame of claim 1, wherein each of said adjustable length support beams comprises a pair of outer beam sections, each of which is mounted to one of the support columns of one of said pairs of support columns, and a central beam section extending between the outer beam sections, wherein portions of said central beam section are slidably received and adjustably secured within said outer beam sections, at opposite ends of the central beam section.

10. The adjustable frame of claim 9, wherein said central beam section includes a web extending the length of the central beam section, and said outer beam sections comprise first and second bifurcated beam sections, each of said first and second bifurcated beam sections having a slot extending a portion of their respective lengths, wherein said web of the central beam section is slidably received and adjustably secured within said slots of the first and second bifurcated beam sections.

11. The adjustable frame of claim 10, wherein each of said first and second bifurcated beam sections comprises a pair of elongate channel members secured with respect to one another in spaced-apart relationship such that said slot is provided between said channel members.

12. The adjustable frame of claim 11, wherein each of said channel members of the first and second beam sections has a web and a pair of flanges extending away from one side of the web, said channel members of each bifurcated beam section secured with respect to one another such that that their respective webs are in a facing relationship, with the slot of the bifurcated beam section provided between the webs of the channel members.

13. The adjustable frame of claim 12, wherein said central beam section comprises an I-beam having a pair of flanges extending away from both sides of the web of the central beam section, wherein when the web of the central beam section is slidably received within the slot of the first and second bifurcated beam sections, portions of the channel members of the first and second bifurcated beam sections are slidably received between the flanges of the central beam section, on opposite sides of the web of the central beam section.

14. The adjustable frame of claim 10, wherein each of said beam sections includes a plurality of apertures, the apertures of the central beam section alignable with apertures of the first and second bifurcated beam sections at a plurality of beam lengths for receiving fasteners through the aligned apertures in order to secure the beam at one of said plurality of beam lengths.

15. An adjustable frame for a mine ventilation structure, said frame having a width, a height and a length, comprising:
(a) two or more pairs of adjustable height support columns, said pairs of support columns in spaced-apart relationship along the length of the frame; and
(b) a plurality of adjustable length support beams extending across the width of the frame, wherein one of said adjustable length support beams is rotatably mounted to and spans between the support columns of each of said pairs of support columns such that the support beam is adjustable rotatably with respect to the support columns to which it is mounted, thereby allowing the angle of the support beam with respect to the length of the frame to be adjusted by rotation of the support beam with respect to the support columns;
wherein the adjustable height support columns allow the height of the frame to be adjusted, the adjustable length support beams allow the width of the frame to be adjusted, and the angular adjustability of the support beams allows the frame to be adjusted to fit an angled intersection in a mine.

16. The adjustable frame of claim 15, wherein each of said support beams has first and second ends and a mounting leg extending downwardly from the support beam adjacent each end of the support beam, and further wherein each of said support columns includes a mounting leg receiver at the upper end of the support column, such that each of the mounting legs of said support beams is positioned within one of said mounting leg receivers, thereby mounting each support beam to a pair of support columns.

17. The adjustable frame of claim 16, wherein said mounting legs are rotatably received within said mounting leg receivers such that each support beam is adjustable rotatably with respect to the upper ends of the support columns on which it is mounted.

18. A mine overcast comprising:
(a) an adjustable frame comprising
two or more pairs of adjustable height support columns, and
a plurality of adjustable length support beams, each support beam mounted to and spanning between a pair of said support columns,
wherein the frame is adjustable vertically and laterally; and
(b) a plurality of side and ceiling panels mounted to said frame, said ceiling panels mounted between adjacent support beams, and said side panels mounted between adjacent support columns along either side of the frame,
such that a tunnel is provided beneath the ceiling panels, bounded on either side by the side panels; and
further wherein each support beam is mounted to said support columns such that the support beam is adjustable rotatably with respect to the support columns to which it is mounted, thereby allowing the angle of each support beam with respect to said side panels, as viewed from above, to be adjusted, thereby allowing the overcast to be adjusted to fit an angled intersection in a mine.

19. The mine overcast of claim 18, further comprising a plurality of panel retention clips configured to retain the side panels and ceiling panels in place.

20. The mine overcast of claim 18, further comprising a cementitious sealing composition applied over at least one surface of the side or ceiling panels.

21. A kit for assembling an adjustable frame for a mine ventilation structure, comprising:
  (a) two or more pairs of adjustable height support columns, each of said support columns including a first post having a web extending at least a portion of its length, and a second bifurcated post having a slot extending a portion of its length, wherein a portion of said web of the first post is slidably receivable and adjustably securable within said slot of the second bifurcated post; and
  (b) a plurality of adjustable length support beams, each of said support beams including an I-beam section having upper and lower flanges joined by a web, and at least one bifurcated beam section having a slot extending a portion of its length, wherein a portion of the web of the I-beam section is slidably receivable and adjustably securable within said slot of said at least one bifurcated beam section, each assembled support beam rotatably mountable to a pair of said support columns such that the support beam spans between the support columns and such that the angle of the support beam with respect to the length of the frame can be adjusted by rotation of the support beam with respect to the support columns;
  wherein, when assembled, the frame is adjustable vertically and laterally and the assembled support columns and support beams have I-beam cross-sectional shapes.

\* \* \* \* \*